(12) United States Patent
Takara et al.

(10) Patent No.: US 12,270,432 B2
(45) Date of Patent: Apr. 8, 2025

(54) JOURNAL BEARING AND ROTATING MACHINE

(71) Applicant: Mitsubishi Generator Co., Ltd., Hyogo (JP)

(72) Inventors: Naokatsu Takara, Tokyo (JP); Yosuke Uchida, Tokyo (JP); Saya Okano, Tokyo (JP)

(73) Assignee: MITSUBISHI GENERATOR CO., LTD., Kobe (JP)

( * ) Notice: Subject to any disclaimer, the term of this patent is extended or adjusted under 35 U.S.C. 154(b) by 55 days.

(21) Appl. No.: 18/035,941

(22) PCT Filed: Jan. 20, 2021

(86) PCT No.: PCT/JP2021/001802
§ 371 (c)(1),
(2) Date: May 9, 2023

(87) PCT Pub. No.: WO2022/157850
PCT Pub. Date: Jul. 28, 2022

(65) Prior Publication Data
US 2023/0407909 A1   Dec. 21, 2023

(51) Int. Cl.
*F16C 17/03* (2006.01)
*F16C 33/10* (2006.01)

(52) U.S. Cl.
CPC .............. *F16C 17/03* (2013.01); *F16C 33/10* (2013.01); *F16C 33/105* (2013.01); *F16C 2380/26* (2013.01)

(58) Field of Classification Search
CPC ...... F16C 17/03; F16C 33/10; F16C 33/1025; F16C 33/1045; F16C 33/106; F16C 2380/26; F16C 17/24; F16C 33/105
See application file for complete search history.

(56) References Cited

U.S. PATENT DOCUMENTS 10,724,573 B2 *  7/2020  Nakano .................. F16C 33/046
11,143,242 B2 * 10/2021  Shinohara ............. F16C 33/748
(Continued)

FOREIGN PATENT DOCUMENTS

JP    H04-050721 U    4/1992
JP    9-126228 A      5/1997
(Continued)

OTHER PUBLICATIONS

International Search Report and Written Opinion mailed on Apr. 6, 2021, received for PCT Application PCT/JP2021/001802, filed on Jan. 20, 2021, 9 pages including English Translation.
(Continued)

*Primary Examiner* — Alan B Waits
(74) *Attorney, Agent, or Firm* — XSENSUS LLP

(57) ABSTRACT

Oil outlets penetrating from an inner circumferential surface to an outer circumferential surface of a carrier ring are located in at least two of: a range that is on a forward side in a rotation direction of a rotary shaft from an upstream pivot and on a backward side in the rotation direction of the rotary shaft from a downstream pivot, a range that is from 180 degrees to 360 degrees and is from a position at a vertical height of the downstream pivot to a position at a topmost vertical height of the rotary shaft, or a range that is from 0 degrees to 180 degrees and is from a position at a vertical height of the upstream pivot to the position at the topmost vertical height of the rotary shaft.

20 Claims, 16 Drawing Sheets

(56) References Cited

U.S. PATENT DOCUMENTS

| | | | |
|---|---|---|---|
| 2010/0220944 A1* | 9/2010 | Waki | F16C 33/08 |
| | | | 384/418 |
| 2019/0010976 A1 | 1/2019 | Shinohara et al. | |
| 2019/0101155 A1* | 4/2019 | Nakano | F16C 33/103 |

FOREIGN PATENT DOCUMENTS

| JP | 2009-185875 A | 8/2009 |
|---|---|---|
| JP | 2014-202268 A | 10/2014 |
| JP | 2017-155755 A | 9/2017 |
| JP | 2020-73822 A | 5/2020 |
| JP | 2020-133734 A | 8/2020 |

OTHER PUBLICATIONS

German Office Action dated May 6, 2024, in corresponding German Patent Application No. DE112021006840.7, 10pp.

* cited by examiner

JOURNAL BEARING AND ROTATING MACHINE

CROSS-REFERENCE TO RELATED APPLICATION

The present application is based on PCT filing PCT/JP2021/001802, filed Jan. 20, 2021, the entire contents of which are incorporated herein by reference.

TECHNICAL FIELD

The present disclosure relates to a journal bearing and a rotating machine.

BACKGROUND ART

A conventional journal bearing is a bearing device for supporting a rotary shaft of a rotating machine by a plurality of bearing pads arranged with an interval therebetween in the rotation direction of the rotary shaft, and has an oil discharge adjustment valve which opens/closes a discharge port so is to adjust the storage amount of oil (lubricant) in a bearing region where the pads are arranged. For example, Patent Document 1 discloses that, during high-speed rotation, a discharge port is opened to reduce the storage amount of oil, thereby reducing churning loss caused by churning of oil in a bearing region along with rotation of a rotary shaft.

CITATION LIST

Patent Document

Patent Document 1: Japanese Laid-Open Patent Publication No. 2009-185875

SUMMARY OF THE INVENTION

Problems to be Solved by the Invention

In the conventional journal bearing and rotating machine, when the storage amount of oil in the bearing region is reduced to reduce churning loss, oil becomes insufficient in a gap between the outer circumferential surface of the rotary shaft and the inner circumferential surface of each pad, so that an oil-film pressure generated in the gap decreases constantly or transiently, thus causing a problem of increasing unstable vibration of the pads and the rotary shaft.

The present disclosure has been made to solve the above problem, and an object of the present disclosure is to provide a journal bearing and a rotating machine that suppress unstable vibration of pads and a rotary shaft.

Solution to the Problems

A journal bearing according to the present disclosure supports a rotary shaft of a rotating machine and includes: a carrier ring provided on an outer circumferential side of the rotary shaft with an interval therebetween, where a half of the carrier ring that is positioned on a load-direction side of the rotary shaft is defined as a lower-half part; an upstream pad and a downstream pad which are located at different positions in a circumferential direction, between an inner circumferential surface of the lower-half part of the carrier ring and an outer circumferential surface of the rotary shaft, the upstream pad being positioned on a backward side in a rotation direction of the rotary shaft, and the downstream pad being positioned on a forward side in the rotation direction of the rotary shaft; an upstream pivot swingably supporting the upstream pad at an inner circumferential surface of the carrier ring; a downstream pivot swingably supporting the downstream pad at the inner circumferential surface of the carrier ring; and side plates respectively covering at both ends in an axial direction of the upstream pad and the downstream pad. The carrier ring has a plurality of oil outlets arranged in the circumferential direction and penetrating from the inner circumferential surface to an outer circumferential surface of the carrier ring. Where, in a cross-section of the journal bearing along a direction perpendicular to the axial direction, an upper end in the load direction is defined as 0 degrees, a lower end is defined as 180 degrees, and the upper end is further defined as 360 degrees, along the rotation direction, the oil outlets are located in, of the carrier ring, at least two of a range that is on the forward side in the rotation direction of the rotary shaft from the upstream pivot and on the backward side in the rotation direction of the rotary shaft from the downstream pivot, a range that is from 180 degrees to 360 degrees and is from a position at a vertical height of the downstream pivot to a position at a topmost vertical height of the rotary shaft, or a range that is from 0 degrees to 180 degrees and is from a position at a vertical height of the upstream pivot to the position at the topmost vertical height of the rotary shaft.

A rotating machine according to the present disclosure includes: the above journal bearing; and the rotary shaft supported by the journal bearing.

Effect of the Invention

The journal bearing and the rotating machine according to the present disclosure can suppress unstable vibration of pads and a rotary shaft.

DESCRIPTION OF EMBODIMENTS

A journal bearing described in each embodiment below is a plain bearing rotatably supporting a rotary shaft. The journal bearing is applicable to various rotating machines such as a rotating electric machine.

Embodiment 1

Figure 1:
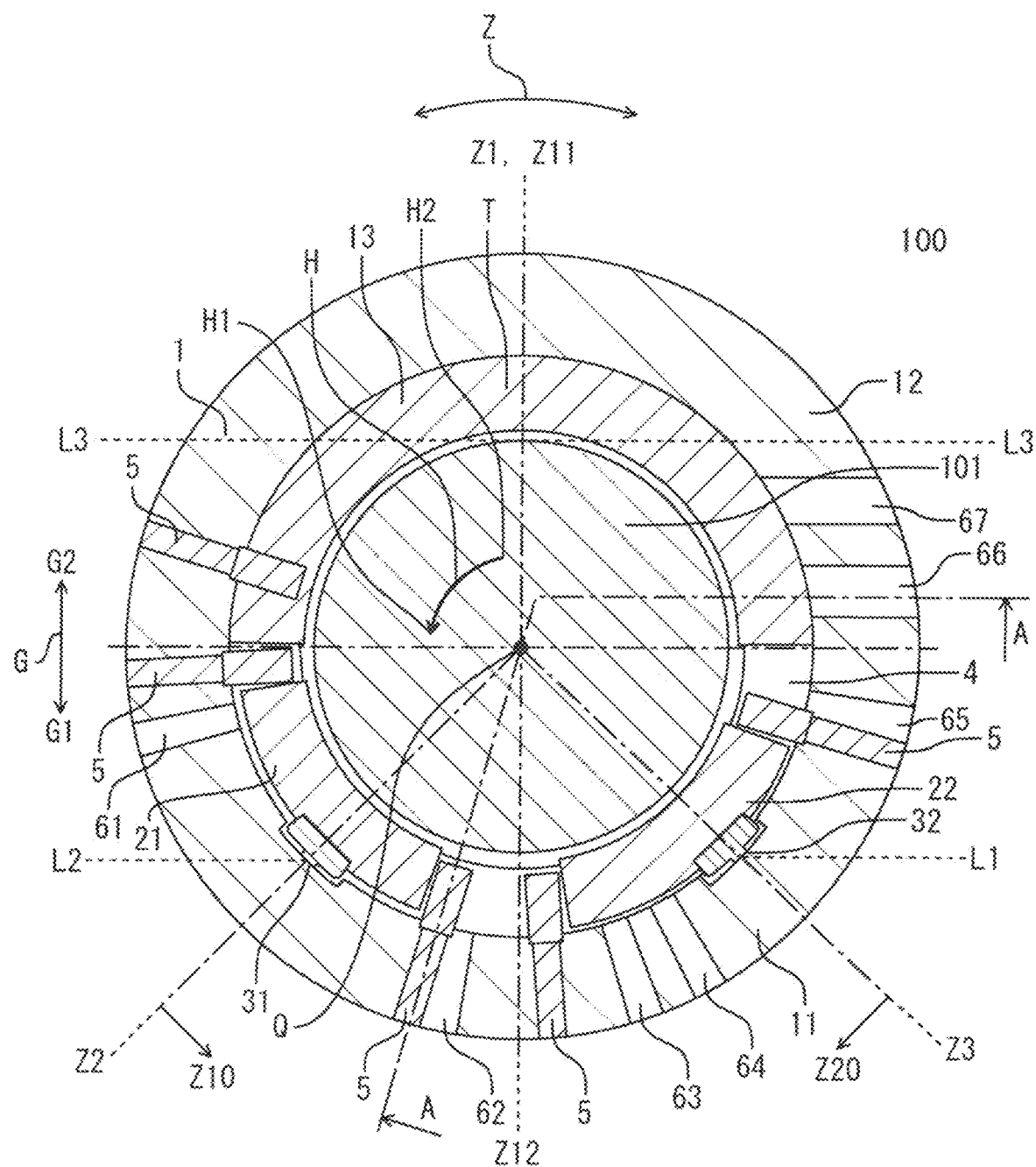
FIG. 1 is a sectional view of a journal bearing according to embodiment 1, along a direction perpendicular to the axial direction.
Figure 2:
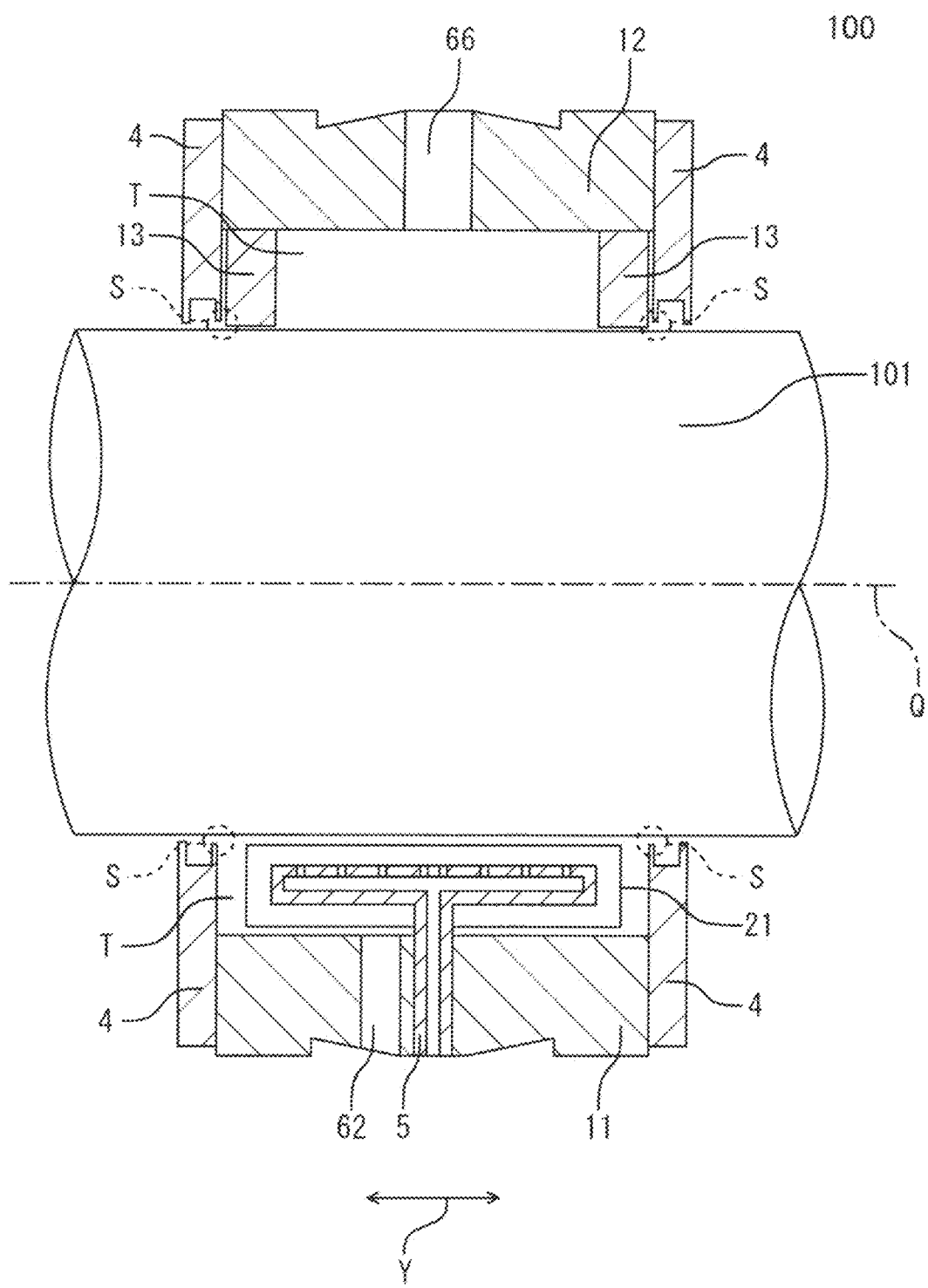
FIG. 2 is a sectional view of the journal bearing shown in FIG. 1, along line A-A.

FIG. 1 is z sectional view showing the structure of a journal bearing 100 according to embodiment 1. FIG. 1 shows a cross-section of the journal bearing 100 and a rotary shaft 101 of a rotating machine 1000 (which is described in other embodiments below; see FIG. 13), taken along a plane perpendicular to an axis Q of the rotary shaft 101. The up-down direction on the drawing sheet in FIG. 1 represents the vertical up-down direction. FIG. 2 is a sectional view of the journal bearing 100 shown in FIG. 1, along line A-A.

As shown in FIG. 1 and FIG. 2, the journal bearing 100 has an annular shape in its entirety. In the journal bearing 100, the rotary shaft 101 is inserted. The journal bearing 100 is configured to rotatably support the rotary shaft 101. The axis Q of the rotary shaft 101 extends in the horizontal direction. In FIG. 1, a rotation direction H of the rotary shaft 101 is a counterclockwise direction. The forward side in the rotation direction H is defined as a forward side H1, and the backward side in the rotation direction H is defined as a backward side H2. In the following description, the forward side H1 in the rotation direction H and the backward side H2 in the rotation direction H are described relative to a target part. A vertical direction of the rotary shaft 101 is denoted by G, and the downward and upward sides thereof are denoted by G1 and G2, respectively. Also in other embodiments below, the drawings shown in the same manner are subject to the same definitions.

A direction parallel to the axis Q of the rotary shaft 101 is defined as an axial direction Y, and the circumferential direction about the axis Q is defined as a circumferential direction Z. These directions are the same as the circumferential direction Z and the axial direction Y of the rotating machine 1000, and also at other parts, these directions are used for indicating directions Y and Z.

The journal bearing 100 includes a carrier ring 1, an upstream pad 21, a downstream pad 22, and side plates 4. The carrier ring 1 is provided on the outer circumferential side of the rotary shaft 101. Of the carrier ring 1, a part located on the downward side G1, i.e., the load-direction side, of the rotary shaft 101 is defined as a lower-half part 11, and a part located on the upward side G2, i.e., the opposite load-direction side, is defined as an upper-half part 12. The upstream pad 21 and the downstream pad 22 are provided between the lower-half part 11 and the outer circumferential surface of the rotary shaft 101. As shown in FIG. 2, the side plates 4 are respectively provided so as to cover both ends in the axial direction Y of a bearing region T described later. This is merely an example, and the side plates 4 may be formed so as to at least respectively cover at both ends in the axial direction Y of the upstream pad 21 and the downstream pad 22.

The upstream pad 21 and the downstream pad 22 are provided along the outer circumferential surface of the rotary shaft 101, at different positions in the circumferential direction Z. The upstream pad 21 is located on the backward side H2 in the rotation direction H of the downstream pad 22 with an interval therebetween in the circumferential direction Z. At the outer circumferential surface of the upstream pad 21, an upstream pivot 31 swingably supporting the upstream pad 21 at the inner circumferential surface of the carrier ring 1 is provided. At the outer circumferential surface of the downstream pad 22, a downstream pivot 32 swingably supporting the downstream pad 22 at the inner circumferential surface of the carrier ring is provided.

By the pivots 31, 32, the pads 21, 22 are each configured to freely tilt relative to the outer circumferential surface of the rotary shaft 101. The journal bearing 100 having the upstream pad 21 and the downstream pad 22 as described above is generally referred to as a tilting-pad journal bearing. The journal bearing 100 has guide metal 13 provided between the upper-half part 12 of the carrier ring 1 and the outer circumferential surface of the rotary shaft 101. The guide metal 13 prevents the rotary shaft 101 from bouncing to the upward side G2 due to vibration or the like.

The journal bearing 100 has a region (hereinafter, referred to as bearing region T) that is present between the outer circumferential surface of the rotary shaft 101 and the inner circumferential surface of the carrier ring 1 and is covered in the axial direction Y by the side plates 4 at both ends in the axial direction Y. The journal bearing 100 has a plurality of oil-supply nozzles 5 which supply oil (lubricant) to the bearing region T and extend inward from the carrier ring 1.

The carrier ring 1 has a plurality of oil outlets 61, 62, 63, 64, 65, 66, 67 arranged in the circumferential direction Z. Here, when any of the oil outlets is merely mentioned, the oil outlet is referred to as oil outlet 6. The oil outlet 6 is, for example, a through hole penetrating from the inner circumferential surface to the outer circumferential surface of the carrier ring 1, and is a hole for discharging oil in the bearing region T to outside of the carrier ring 1.

Here, in FIG. 1, in the cross-section along the direction perpendicular to the axial direction Y of the journal bearing 100, i.e., the axial direction Y of the rotary shaft 101, an upper end Z11 in the load direction is defined as 0 degrees, a lower end Z12 is defined as 180 degrees, and the upper end Z11 is further defined as 360 degrees, along the rotation direction H. The same applies to the other embodiments below, and description thereof is omitted as appropriate.

As shown in FIG. 1, the oil outlets 62, 63, 64 are formed in a range that is on the forward side H1 in the rotation direction H of the rotary shaft 101 from the upstream pivot 31 and on the backward side H2 in the rotation direction H of the rotary shaft 101 from the downstream pivot 32. This range is a range in the circumferential direction Z from an arrow Z10 to an arrow Z20 in FIG. 1. The positions of the upstream pivot 31 and the downstream pivot 32 refer to fulcrum parts on the inner circumferential surface of the carrier ring 1.

The oil outlets 65, 66, 67 are formed in a range that is from 180 degrees to 360 degrees and is from a position at a vertical height L1 of the downstream pivot 32 to a position at a topmost vertical height L3 of the rotary shaft 101. Here, the range from 180 degrees to 360 degrees is a right half range from the lower end Z12 to the upper end Z11 on the drawing sheet in FIG. 1.

The oil outlet 61 is formed in a range that is from 0 degrees to 180 degrees and is from a position at a vertical height L2 of the upstream pivot 31 to a position at the topmost vertical height L3 of the rotary shaft 101. Here, the range from 0 degrees to 180 degrees is a left half range from the upper end Z11 to the lower end Z12 on the drawing sheet in FIG. 1.

The three ranges as described above are ranges divided in three in the circumferential direction Z at a circumferential-direction position Z1, a circumferential-direction position Z2, and a circumferential-direction position Z3. In embodiment 1, the oil outlets 6 are provided in all the three ranges. The oil outlets 6 may be formed in any two of the three ranges. However, in each of the range from the circumferential-direction position Z1 to the circumferential-direction position Z2 and the range from the circumferential-direction position Z1 to the circumferential-direction position Z1, no oil outlets 6 are formed on the upward side G2 from the vertical height L3, as described above.

Flow of oil present between the journal bearing 100 and the rotary shaft 101 in embodiment 1 configured as described above will be described. Most of oil supplied from the oil-supply nozzle 5 to the bearing region T flows in the same direction as the rotation direction H of the rotary shaft 101 due to a shear force by rotation of the rotary shaft 101, and a part of the oil flows into a region between the outer circumferential surface of the rotary shaft 101 and the inner circumferential surface of each pad 21, 22. When the bearing region T is filled with the oil, an oil film is formed in a gap between components and the oil film is sheared by rotation of the rotary shaft 101, whereby an oil-film pressure is generated between the outer circumferential surface of the rotary shaft 101 and the inner circumferential surface of each pad 21, 22.

When the rotational speed of the rotary shaft 101 is high, the rotary shaft 101 and each pad 21, 22 are supported without contact therebetween, by the oil-film pressure. A part of the oil supplied from the oil-supply nozzle 5 or oil leaking from the gap between the outer circumferential surface of the rotary shaft 101 and the inner circumferential surface of each pad 21, 22, is accumulated in the other bearing region T. Regarding churning loss (hereinafter, simply referred to as churning loss) that occurs when oil in the bearing region T generated in the journal bearing 100 is churned, the churning loss occurs when oil accumulated in the bearing region T is churned along with rotation of the rotary shaft 101, and the churning loss increases in proportion to the contact area between the outer circumferential surface of the rotary shaft 101 and oil accumulated in the bearing region T.

Along with rotation of the rotary shaft 101, a part of oil accumulated in the bearing region T is supplied to a region between the outer circumferential surface of the rotary shaft 101 and the inner circumferential surface of each pad 21, 22 again, to be circulated. Another part of the oil passes through gaps between the outer circumferential surface of the rotary shaft 101 and the side plates 4 (e.g., parts S enclosed by dotted lines in FIG. 2), to be discharged to outside of the journal bearing 100, and still another part of the oil passes through each oil outlet 6, to be discharged to outside of the journal bearing 100.

Next, actions of the oil outlets 6 will be described. In a general tilting-pad journal bearing, oil is accumulated in order from the downward side G1 in the bearing region T. Therefore, usually, oil is accumulated on the downward side G1 in the bearing region T and air is accumulated at an upper part on the upward side G2 in the bearing region T. When the rotary shaft 101 is rotating, on the backward side H2 in the rotation direction H of the upstream pad 21, air accumulated on the upward side G2 in the bearing region T flows to the forward side H1 in the rotation direction H due to a shear force by rotation of the rotary shaft 101, and on the forward side H1 in the rotation direction H of the downstream pad 22, oil accumulated on the downward side G1 in the bearing region T flows to the forward side H1 in the rotation direction H due to a shear force by rotation of the rotary shaft 101.

Therefore, on the backward side H2 in the rotation direction H of the upstream pad 21, the height of the oil-air interface (hereinafter, referred to as oil surface) is readily lowered, and on the forward side H1 in the rotation direction H of the downstream pad 22, the oil surface is readily raised. At the outer circumferential surface of the rotary shaft 101 belch the height of the oil surface, churning loss occurs. The churning loss is proportional to the height of the oil surface. For example, in the pad-type journal bearing having oil outlets in Patent Document 1, when the oil-surface height is lowered by the oil outlets, the contact area between the outer circumferential surface of the rotary shaft and oil is reduced, whereby churning loss can be reduced. However, the oil surface in the bearing region between the outer circumferential surface of the rotary shaft and the inner circumferential surface of each pad is lowered, so that oil becomes insufficient in each gap. Thus, the oil-film pressure is lowered constantly or transiently, so that unstable vibration of the pads and the rotary shaft increases.

Meanwhile, in embodiment 1 shown in FIG. 1, the oil outlets 6 are located in at least two of the range that is on the forward side H1 in the rotation direction H of the rotary shaft 101 from the upstream pivot 31 and on the backward side H2 in the rotation direction H of the rotary shaft 101 from the downstream pivot 32, the range that is from 180 degrees to 360 degrees and is from the position at the vertical height L1 of the downstream pivot 32 to the position at the topmost vertical height L3 of the rotary shaft 101, or the range that is from 0 degrees to 180 degrees and is from the position at the vertical height L2 of the upstream pivot 31 to the position at the topmost vertical height L3 of the rotary shaft 101.

The upstream pivot 31 connects the carrier ring 1 and the upstream pad 21, and the downstream pivot 32 connects the carrier ring 1 and the downstream pad 22. Therefore, at the position in the circumferential direction Z of the upstream pivot 31 or the downstream pivot 32, a flow path for oil is not present or is very narrow, so that the movement amount of oil passing the position in the circumferential direction Z of the upstream pivot 31 or the downstream pivot 32 is very small. In addition, due to the gravity, the movement amount of oil passing the position in the circumferential direction Z on the upward side G2 of the rotary shaft 101 is also small.

Accordingly, oil accumulated in the bearing region T is divided in three in the circumferential direction Z at the circumferential-direction position Z2 of the upstream pivot 31, the circumferential-direction position Z3 of the downstream pivot 32, and the circumferential-direction position Z1 on the upward side G2 in the vertical direction G of the rotary shaft 101, around the axis Q of the rotary shaft 101. In the present embodiment, of the three divided oils, the oils in at least two regions can be discharged through the oil outlets 6, and therefore the oil-surface distribution can be adjusted by the regions in the circumferential direction Z.

Figure 4:
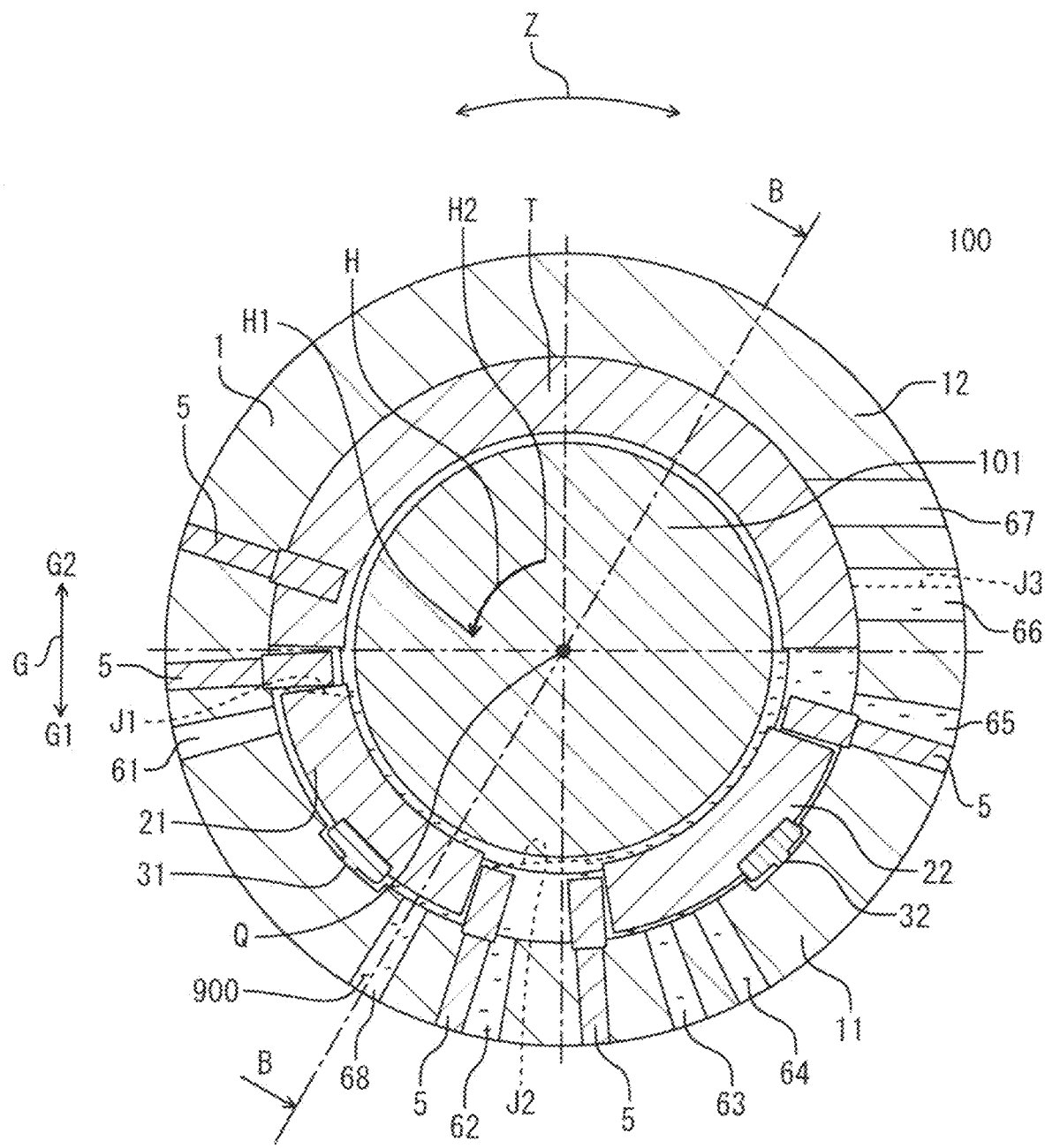
FIG. 4 is a sectional view of a journal bearing according to embodiment 3, along a direction perpendicular to the axial direction.

That is, in embodiment 1, an oil-surface height J1 on the backward side H2 in the rotation direction H of the upstream pad 21, an oil-surface height J2 between an end of the upstream pad 211 and an end of the downstream pad 22 that face each other in the circumferential direction Z, and an oil-surface height A3 on the forward side H1 in the rotation direction H of the downstream pad 22, can be adjusted individually. Examples of the oil-surface heights J1, J2, J3 are shown in FIG. 4, for reference.

For example, the oil outlets 62, 63, 64 may be formed at positions that are on the forward side H1 in the rotation direction H of the rotary shaft 101 from the upstream pivot 31 and on the backward side H2 in the rotation direction H of the rotary shaft 101 from the downstream pivot 32, and the oil outlets 65, 66, 67 may be formed in the range that is from 180 degrees to 360 degrees and is from the position at the vertical height L1 of the downstream pivot 32 to the position at the topmost vertical height L3 of the rotary shaft 101, whereby the oil-surface height J2 between the upstream pad 21 and the downstream pad 22 and the oil-surface height J3 on the forward side H1 in the rotation direction H of the downstream pad 22 can be adjusted individually.

Thus, while the oil-surface height J3 on the forward side H1 in the rotation direction H of the downstream pad 22 where the oil surface is readily raised through rotation of the rotary shaft 101 is significantly lowered, the oil-surface height J2 between the upstream pad 21 and the downstream pad 22 can be kept at such a level that the gap between the inner circumferential surface of the downstream pad 22 and the outer circumferential surface of the rotary shaft 101 is filled with oil.

In addition, for example, the oil outlets 62, 63, 64 may be formed at positions that are on the forward side H1 in the rotation direction H of the rotary shaft 101 from the upstream pivot 31 and on the backward side H2 in the rotation direction H of the rotary shaft 101 from the downstream pivot 32, and the oil outlet 61 may be formed in the range that is from 0 degrees to 180 degrees and is from the position at the vertical height 12 of the upstream pivot 31 to the position at the topmost vertical height L3 of the rotary shaft 101, whereby the oil-surface height J2 between the upstream pad 21 and the downstream pad 22 and the oil-surface height J1 on the backward side H2 in the rotation direction H of the upstream pad 21 can be adjusted individually.

Thus, while the oil-surface height J2 between the upstream pad 21 and the downstream pad 22 is lowered to such a level that the gap between the inner circumferential surface of the downstream pad 22 and the outer circumferential surface of the rotary shaft 101 is filled with oil, the oil-surface height J1 on the backward side H2 in the rotation direction H of the upstream pad 21 where the oil surface is readily lowered through rotation of the rotary shaft 101 can be kept at such a level that the gap between the inner circumferential surface of the upstream pad 21 and the cuter circumferential surface of the rotary shaft 101 is filled with oil.

In addition, for example, the oil outlets 65, 66, 67 may be formed in the range that is from 180 degrees to 360 degrees and is from the position at the vertical height L1 of the downstream pivot 32 to the position at the topmost vertical height L3 of the rotary shaft 101, and the oil outlet 61 may be formed in the range that is from 0 degrees to 180 degrees and is from the position at the vertical height L2 of the upstream pivot 31 to the position at the topmost vertical height L3 of the rotary shaft 101, whereby the oil-surface height J3 on the forward side H1 in the rotation direction H of the downstream pad 22 and the oil-surface height J1 on the backward side H2 in the rotation direction H of the upstream pad 21 can be adjusted individually.

Thus, while the oil-surface height J3 on the forward side H1 in the rotation direction H of the downstream pad 22 where the oil surface is readily raised through rotation of the rotary shaft 101 is significantly lowered, the oil-surface height J1 on the backward side H2 in the rotation direction H of the upstream pad 21 where the oil surface is readily lowered through rotation of the rotary shaft 101 can be kept at such a level that the gap between the inner circumferential surface of the upstream pad 21 and the outer circumferential surface of the rotary shaft 101 is filled with the oil.

All the oil outlets 6 are located at positions lower than the topmost vertical height L3 of the rotary shaft 101. Thus, the contact area between oil accumulated in order from the downward side G1 and the outer circumferential surface of the rotary shaft 101 can be assuredly reduced. In the present embodiment, the oil-surface distribution in the bearing region T is adjusted by ranges in the circumferential direction Z. Thus, in the gaps between the outer circumferential surface of the rotary shaft 101 and the inner circumferential surfaces of the pads 2, reduction of the oil-surface height J1 or the backward side H2 in the rotation direction H is suppressed and the other oil-surface heights J2, J3 are lowered so that the contact area between the outer circumferential surface of the rotary shaft 101 and oil accumulated in the bearing region T is reduced, whereby unstable vibration of the rotary shaft 101 and each pad 21, 22 is suppressed and churning loss is maximally reduced.

The journal bearing of embodiment 1 configured as described above supports a rotary shaft of a rotating machine and includes: a carrier ring provided on an outer circumferential side of the rotary shaft with an interval therebetween, where a half of the carrier ring that is positioned on a load-direction side of the rotary shaft is defined as a lower-half part; an upstream pad and a downstream pad which are located at different positions in a circumferential direction, between an inner circumferential surface of the lower-half part of the carrier ring and an outer circumferential surface of the rotary shaft, the upstream pad being positioned on a backward side in a rotation direction of the rotary shaft, and the downstream pad being positioned on a forward side in the rotation direction of the rotary shaft; an upstream pivot swingably supporting the upstream pad at an inner circumferential surface of the carrier ring; a downstream pivot swingably supporting the downstream pad at the inner circumferential surface of the carrier ring; and side plates respectively covering at both ends in an axial direction of the upstream pad and the downstream pad. The carrier ring has a plurality of oil outlets arranged in the circumferential direction and penetrating from the inner circumferential surface to an outer circumferential surface of the carrier ring. Where, in a cross-section of the journal bearing along a direction perpendicular to the axial direction, an upper end in the load direction is defined as 0 degrees, a lower end is defined as 180 degrees, and the upper end is further defined as 360 degrees, along the rotation direction, the oil outlets are located in, of the carrier ring, at least two of a range that is on the forward side in the rotation direction of the rotary shaft from the upstream pivot and on the backward side in the rotation direction of the rotary shaft from the downstream pivot, a range that is from 180 degrees to 360 degrees and is from a position at a vertical height of the downstream pivot to a position at a topmost vertical height of the rotary shaft, or a range that is from 0 degrees to 180 degrees and is from 3 position at a vertical height of the upstream pivot to the position at the topmost vertical height of the rotary shaft.

Thus, owing to actions of the oil outlets, the oil-surface distribution in the bearing region can be adjusted by ranges in the circumferential direction, and in the gaps between the outer circumferential surface of the rotary shaft and the inner circumferential surfaces of the pads, reduction of the oil-surface height on the backward side in the rotation direction of the upstream pad can be suppressed and the other oil-surface heights can be reduced so that the contact area between the outer circumferential surface of the rotary shaft and oil accumulated in the bearing region can be reduced, whereby unstable vibration of each pad and the rotary shaft can be suppressed while churning loss can be maximally reduced.

Embodiment 2

Figure 3:
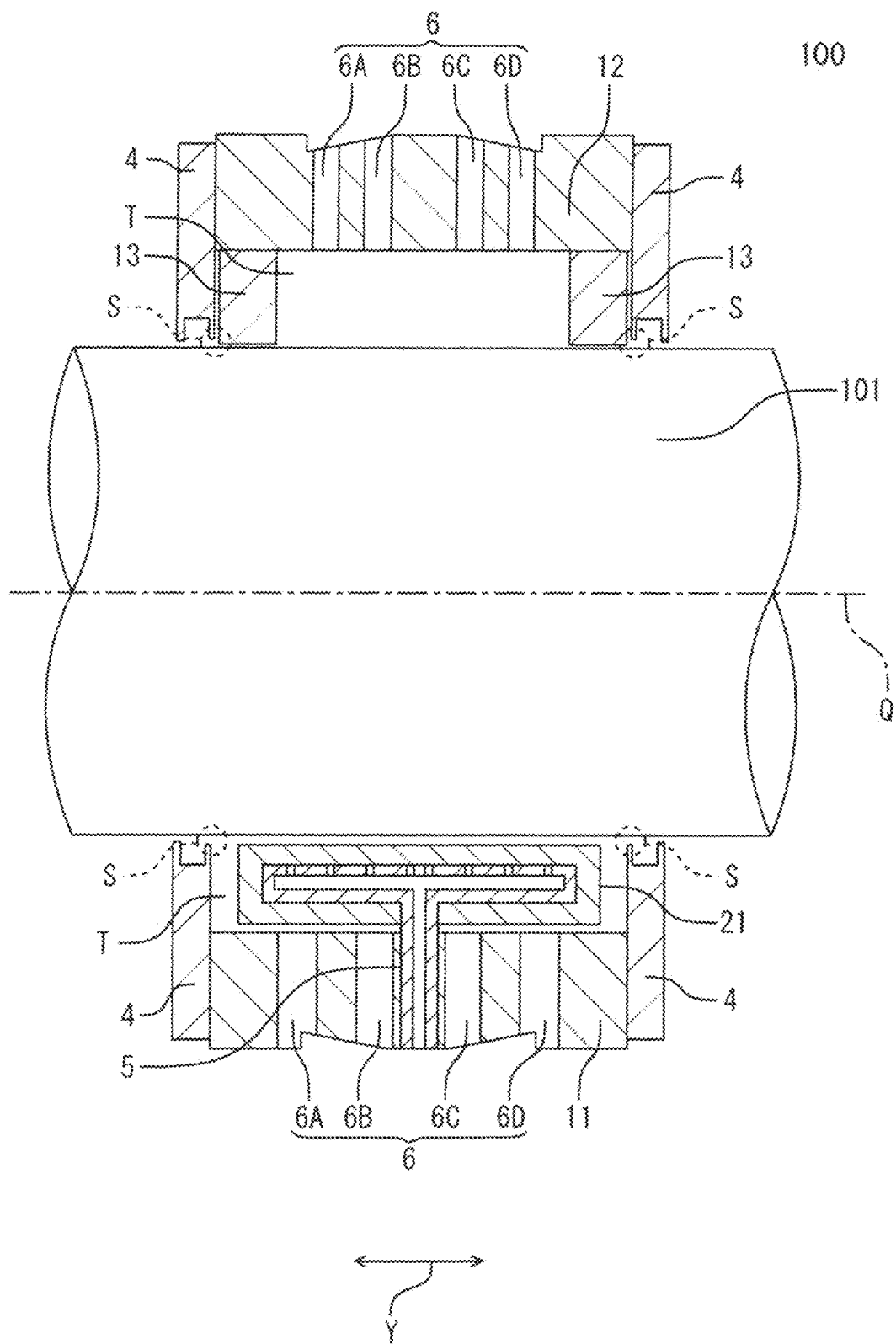
FIG. 3 is a sectional view of a journal bearing according to embodiment 2, along a direction perpendicular to the axial direction.

FIG. 3 is a sectional view of a journal bearing 100 according to embodiment 2, along a direction perpendicular to the axial direction. The same parts as in the above embodiment 1 are denoted by the same reference characters and description thereof is omitted. As shown in FIG. 3, the oil outlets 6 are provided such that a plurality of oil outlets 6A, 6B, 6C, 6D are arranged in the axial direction Y at the same position in the circumferential direction Z.

According to embodiment 2 configured as described above, oil accumulated in the bearing region T can be discharged while being distributed in the axial direction Y, through the oil outlets 6A, 6B, 6C, 6D. Thus, it is possible to suppress such a phenomenon that the oil surface is not lowered at a position in the axial direction Y far from the center position in the axial direction Y of the oil outlet 6 and the outer circumferential surface of the rotary shaft 101 and oil contact with each other so that churning loss occurs. In addition, with this configuration, the oil-surface distribution can be adjusted by the formation positions of the oil outlets 6A to 6D in the axial direction Y.

In a case where the amount of oil discharged through the gaps between the inner circumferential surface of the side plates 4 and the outer circumferential surface of the rotary shaft 101 (e.g., parts S enclosed by dotted lines in FIG. 3) is larger than the oil discharge amount through the oil outlets 6, the oil surfaces at both ends in the axial direction Y of the bearing region T might be readily lowered while the oil surface at the center in the axial direction Y might be less lowered. In this case, the oil outlets 6B, 6C on the center side in the axial direction Y may be formed to be larger than the oil outlets 6A, 6D on the end sides in the axial direction Y, of a lot of oil outlets 6 may be arranged around the center in the axial direction Y, whereby the oil-surface distribution in the axial direction Y can be uniformly lowered. That is, with this configuration, the contact area between the outer circumferential surface of the rotary shaft 101 and oil can be maximally reduced and churning loss can be further reduced.

Flow of oil in the bearing region T is flow along with rotation in the rotation direction H of the rotary shaft 101, and therefore the flow rate in the axial direction Y of oil is smaller than the flow rate in the rotation direction H. In the present embodiment, even if oil does not flow in the axial direction Y, oil can be efficiently discharged through the plurality of oil outlets 6A to 6D arranged in the axial direction Y. Thus, churning loss that occurs in a process in which oil flows in the axial direction Y can be reduced.

In the journal bearing of embodiment 2 configured as described above, the same effects as in the above embodiment 1 are provided, and in addition, at least one of the oil outlets includes a plurality of oil outlets arranged in the axial direction at the same circumferential-direction position.

Thus, oil can be efficiently discharged, whereby unstable vibration of each pad and the rotary shaft can be further suppressed while churning loss can be further reduced.

Embodiment 3

Figure 5:
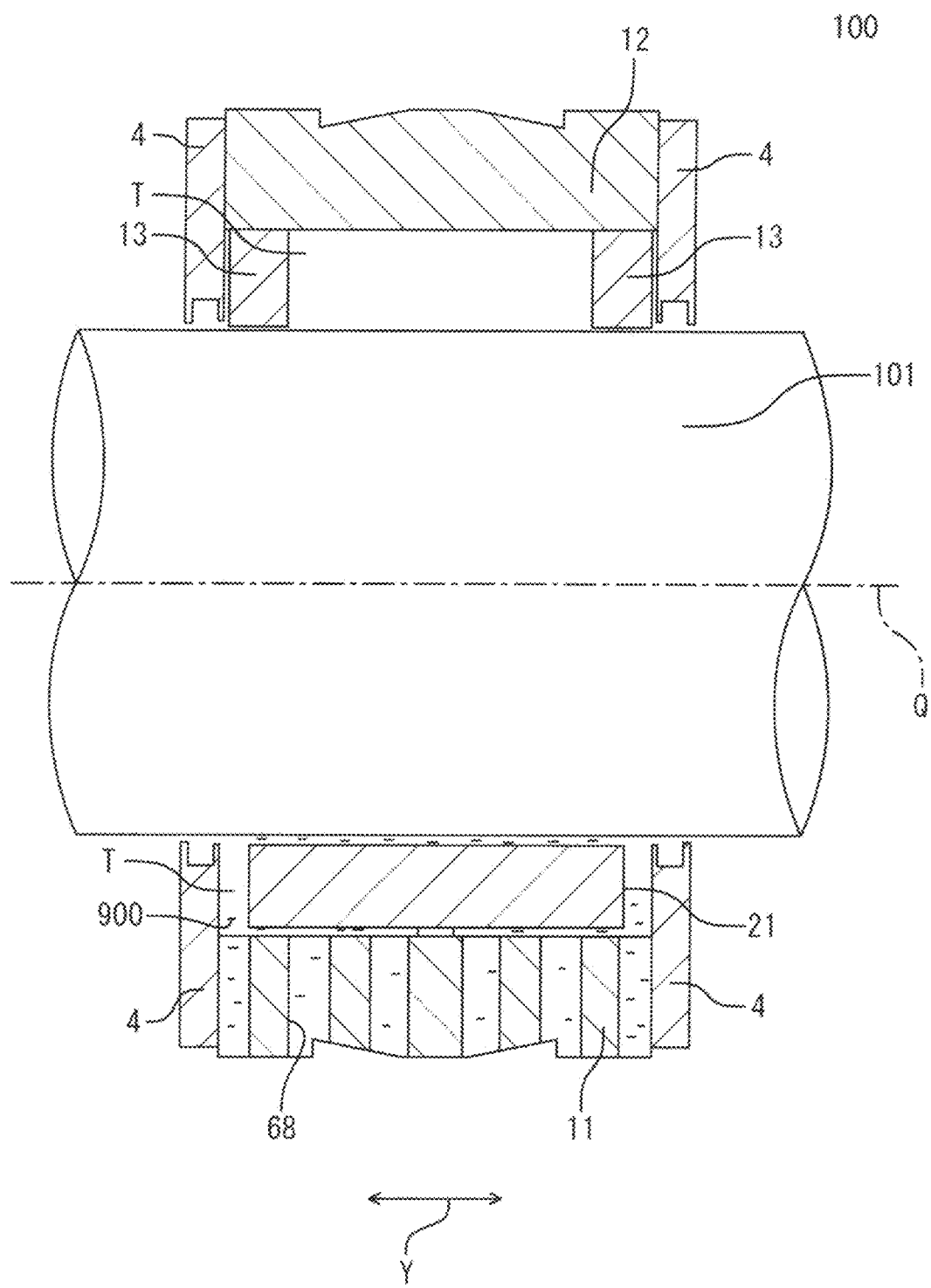
FIG. 5 is a sectional view of the journal bearing shown in FIG. 4, along line B-B.

FIG. 4 is a sectional view of a journal bearing 100 according to embodiment 3, along a direction perpendicular to the axial direction Y. FIG. 5 is a sectional view of the journal bearing 100 shown in FIG. 4, along line B-B. The same parts as in the above embodiments are denoted by the same reference characters and description thereof is omitted.

As shown in FIG. 4 and FIG. 5, an oil outlet 68 is provided at a position in the circumferential direction Z where the upstream pad 21 is formed and that is on the forward side H1 in the rotation direction H from the upstream pivot 31.

In embodiment 3 configured as described above, as shown in FIG. 4, the oil-surface height J2 between the upstream pad 21 and the downstream pad 22 can be lowered, and as shown in FIG. 5, oils 900 present on both end sides in the axial direction Y of the upstream pad 21, which do not contribute to generation of the oil-film pressure, can be actively discharged through the oil outlets 68, whereby the oil-surface height J2 can be lowered. That is, not only churning loss that occurs between the upstream pad 21 and the downstream pad 22 but also churning loss that occurs on both end sides in the axial direction Y of the upstream pad 21 can be reduced.

In the journal bearing of embodiment 3 configured as described above, the same effects as in the above embodiments are provided, and in addition, at least ore of the oil outlets is located in the circumferential direction where the upstream pad is located and that is on the forward side in the rotation direction of the rotary shaft from the upstream pivot.

Thus, churning loss that occurs on both end sides in the axial direction of the upstream pad can be reduced, whereby unstable vibration of each pad and the rotary shaft can be further suppressed while churning loss can be further reduced.

Embodiment 4

Figure 6:
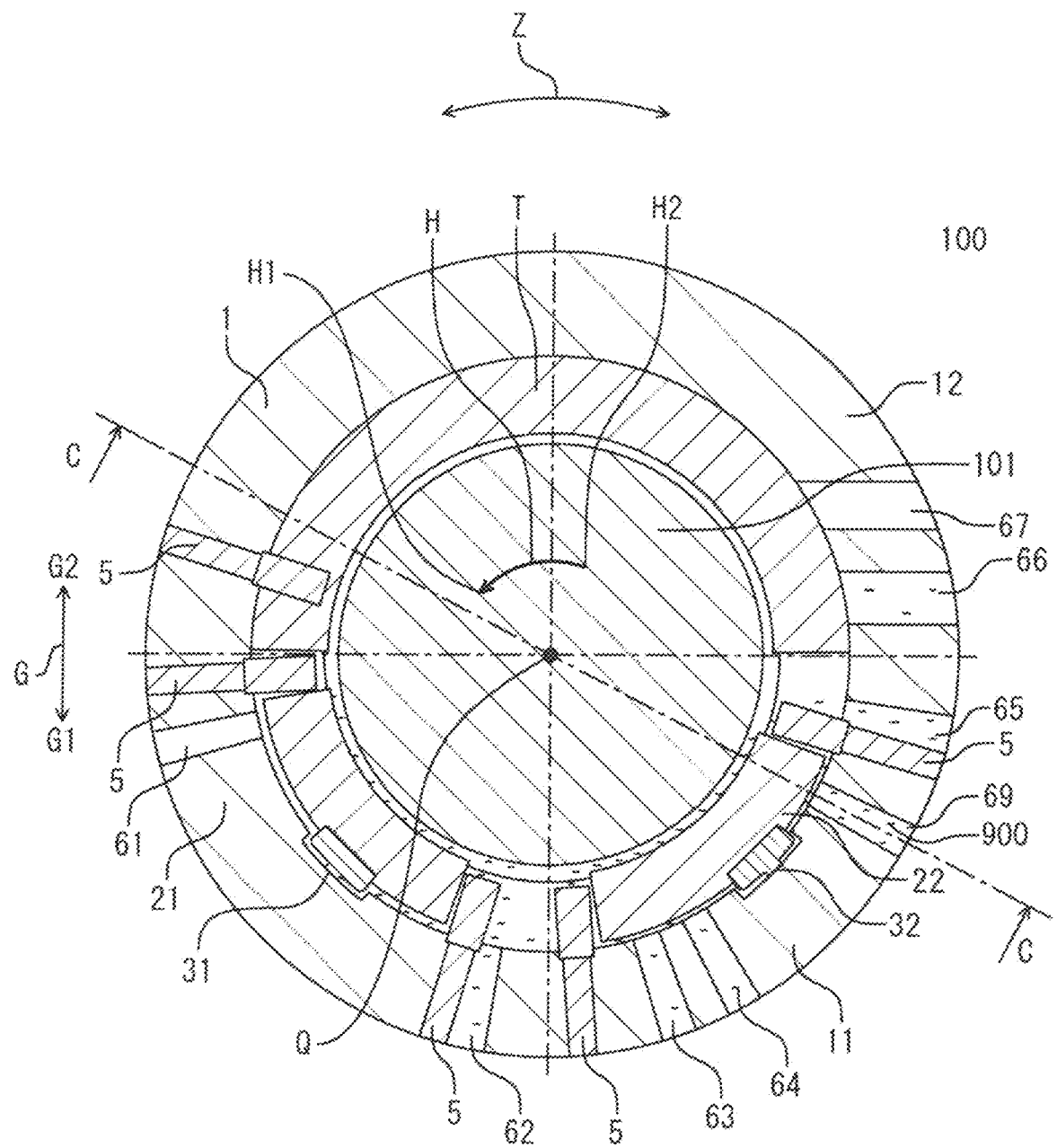
FIG. 6 is a sectional view of a journal bearing according to embodiment 4, along a direction perpendicular to the axial direction.
Figure 7:
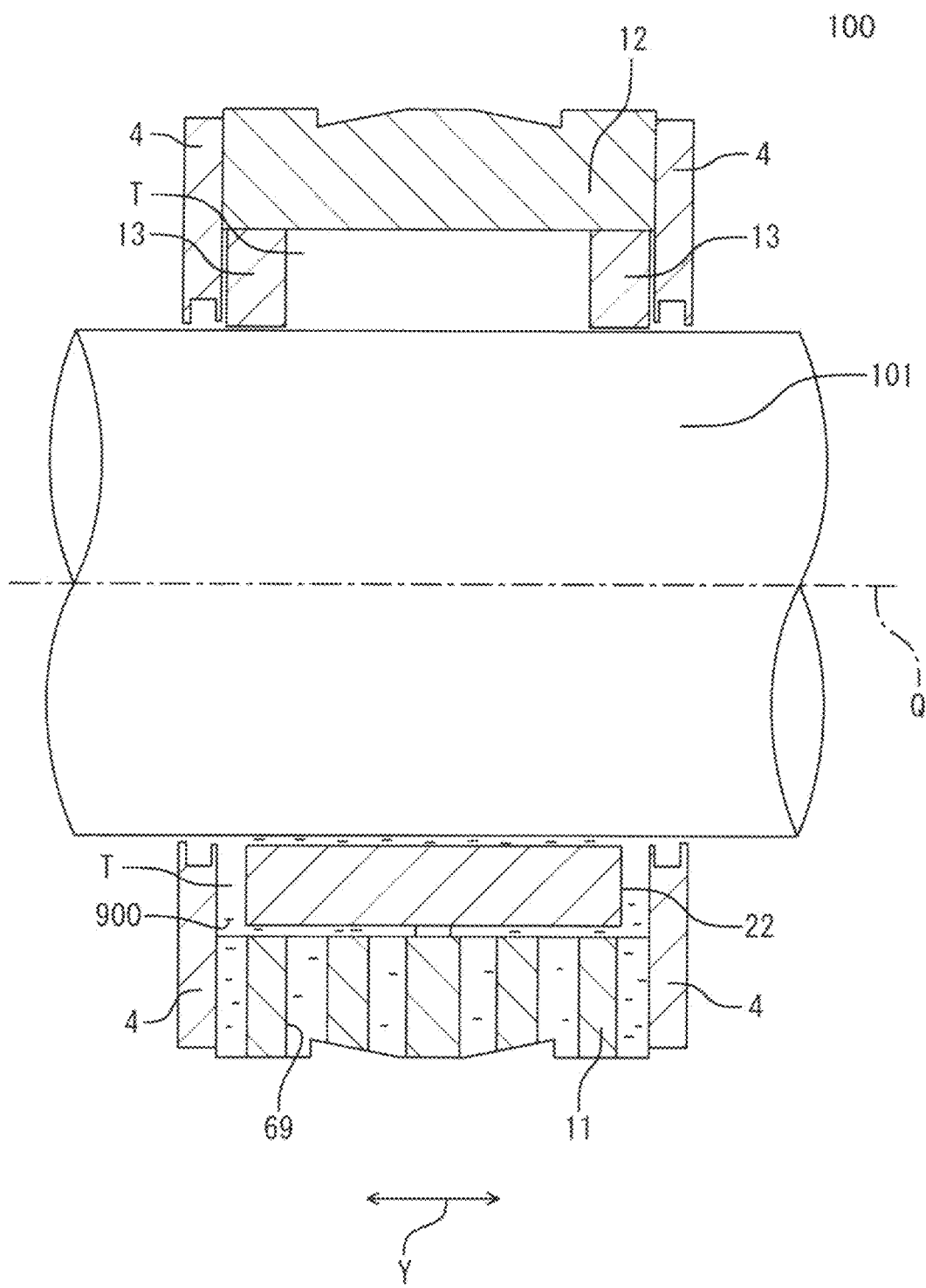
FIG. 7 is a sectional view of the journal bearing shown in FIG. 6, along line C-C.

FIG. 6 is a sectional view of a journal bearing 100 according to embodiment 4, along a direction perpendicular to the axial direction. f. FIG. 7 is a sectional view of the journal bearing 100 shown in FIG. 6, along line C-C. The same parts as in the above embodiments are denoted by the same reference characters and description thereof is omitted.

As shown in FIG. 6 and FIG. 7, an oil outlet 69 is provided at a position in the circumferential direction Z where the downstream pad 22 is formed and that is on the forward side H1 in the rotation direction H from the downstream pivot 32. Thus, an oil discharge path is present on a cross-section passing the axis Q of the rotary shaft 101, the downstream pad 22, and the oil outlet 69. The position of oil 900 is shown in FIG. 6 and FIG. 7.

In embodiment 4 configured as described above, as shown in FIG. 6, the oil-surface height J2 (see FIG. 4) between the upstream pad 21 and the downstream pad 22 can be lowered, and as shown in FIG. 7, oils 900 present on both end sides in the axial direction Y of the downstream pad 22, which do not contribute to generation of the oil-film pressure, can be actively discharged through the oil outlets 69, whereby the oil-surface height J2 can be lowered. That is, not only churning loss that occurs between the upstream pad 21 and the downstream pad 22 but also churning loss that occurs on both end sides in the axial direction Y of the downstream pad 22 can be reduced.

In the journal bearing of embodiment 4 configured as described above, the same effects as in the above embodiments are provided, and in addition, at least one of the oil outlets is located in the circumferential direction where the downstream pad is located and that is on the forward side in the rotation direction of the rotary shaft from the downstream pivot.

Thus, churning loss that occurs on both end sides in the axial direction of the downstream pad can be reduced, whereby unstable vibration of each pad and the rotary shaft can be further suppressed while churning loss can be further reduced.

Embodiment 5

Figure 8:
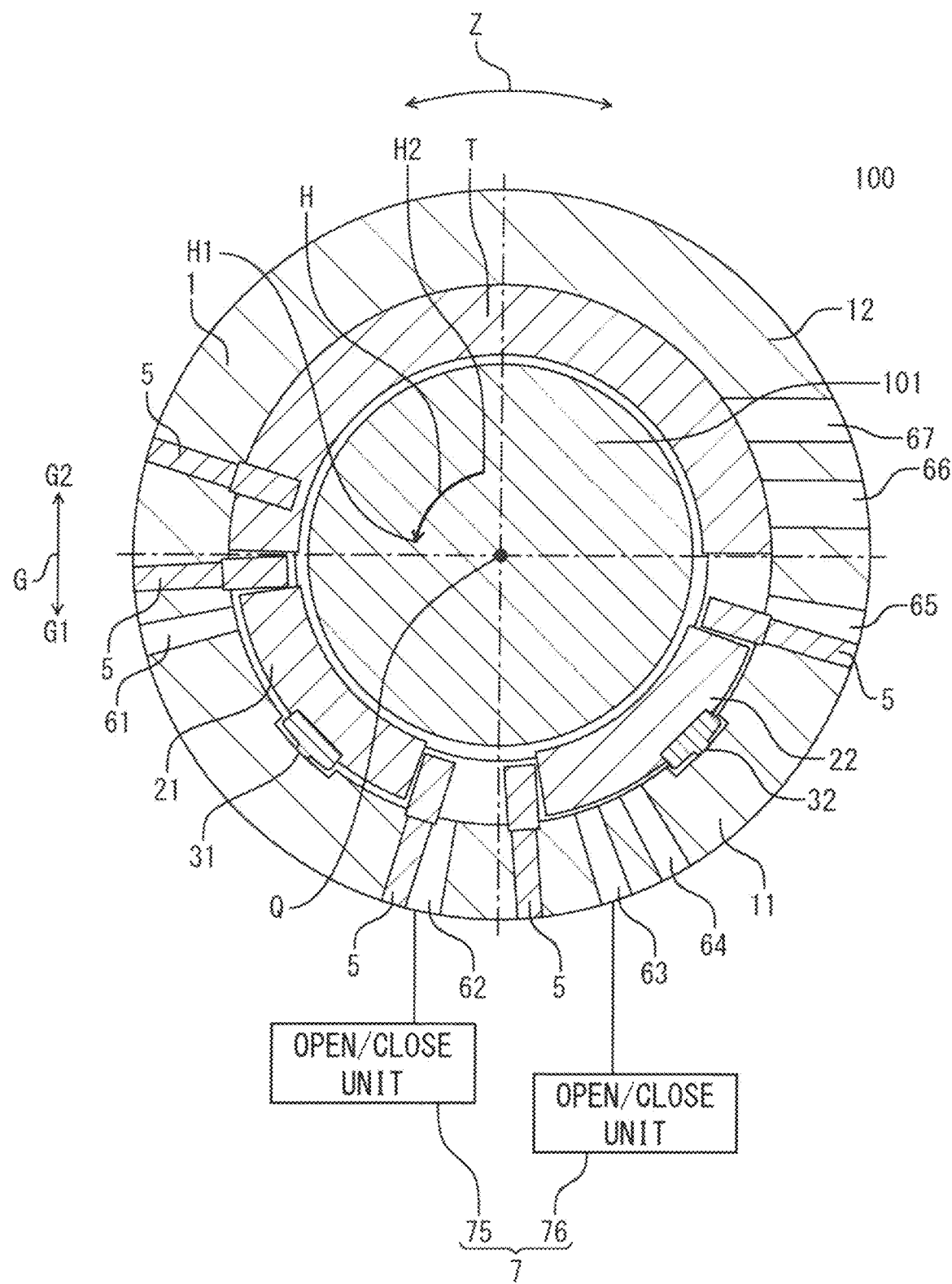
FIG. 8 is a sectional view of a journal bearing according to embodiment 5, along a direction perpendicular to the axial direction.

FIG. 8 is a sectional view of a journal bearing 100 according to embodiment 5, along a direction perpendicular to the axial direction Y. The same parts as in the above embodiments are denoted by the same reference characters and description thereof is omitted.

As shown in FIG. 8, at least one of the oil outlets 6, in embodiment 5, two oil outlets 6, which are oil outlets 62, 63 here, are provided with open/close units 75, 76 for adjusting the oil discharge amounts. The oil outlets 6 provided with the open/close units 75, 76 shown in FIG. 8 are merely an example, and the oil outlets 6 at other positions may be provided with the open/close units. By adjusting the open/close degrees of the open/close units 75, 76, a plurality of oil discharge patterns can be made. In addition, by finely adjusting the open/close units 75, 76, it is possible to finely adjust the oil discharge amount at 100% to 0% with respect to the maximum amount of oil that can be discharged through one oil outlet 6.

The open/close units 75, 76 may be provided on the outer circumferential side of the carrier ring 1 as shown in FIG. 8, for example. However, they may be provided on the inner circumferential side of the carrier ring 1 or inside the carrier ring 1, and the positions thereof are not limited. The configurations of the open/close units are the same as those of open/close units in other embodiments below, and therefore description thereof is omitted as appropriate. When any of the open/close units is mentioned, the open/close unit is referred to is open/close unit 7.

In embodiment 5 configured as described above, for example, the oil outlets 6 are adjusted to be opened/closed in accordance with the operation time of the rotating machine 1000 or the like, whereby the oil discharge pattern can be optimized. As the operation time of the rotating machine 1000 increases, arrangement and joining states of components might be slightly changed due to deterioration or the like, leading to increase in vibration of the rotary shaft 101. If vibration of the rotary shaft 101 increases, the size of the gap between the outer circumferential surface of the rotary shaft 101 and the inner circumferential surface of each pad 21, 22 is temporally changed. As a result, the height of the oil surface adjusted in the initial operation is lowered, so that oil might become insufficient in the gap and unstable vibration of the rotary shaft 101 or each pad 21, 22 might increase.

In embodiment 5, in accordance with the operation time of the rotating machine 1000, the oil outlets 6 can be adjusted to be opened/closed by the open/close units 75, 76 so as to constantly optimize the oil-surface distribution, whereby unstable vibration of each pad 21, 22 and the rotary shaft 101 can be suppressed. For example, as the operation time of the rotating machine 1000 increases, the oil outlet 6 may be partially closed by the open/close unit 7 so as to raise the oil surface, whereby unstable vibration of each pad 21, 22 and the rotary shaft 101 due to oil insufficiency can be suppressed.

Depending oi the installation environment of the rotating machine 1000, for example, the temperature of oil supplied from the oil-supply nozzle 5 might become higher than a prescribed temperature. As such cases, it can be assumed that the outside air temperature is extremely high or oil cooling performance is lowered due to deterioration in a cooling device, or the like. If the viscosity of oil is lowered due to temperature increase thereof, the oil-film pressure for supporting the load of the rotary shaft 101 is lowered, so that the rotary shaft 101 sinks to the downward side G1 in the vertical direction G where the oil is accumulated. Thus, the oil surface rises from the normal position, and due to the rising of the oil surface, churning loss increases.

In this regard, in embodiment 5, in accordance with the installation environment of the rotating machine 1000, the oil outlet 6 can be adjusted to be opened/closed by the open/close unit 7 so as to constantly optimize the oil-surface distribution, whereby unstable vibration can be suppressed constantly while churning loss can be maximally reduced. For example, in a case where the outside air temperature around the rotating machine 1000 is high, the oil outlet 6 may be partially opened to lower the oil surface, whereby the oil surface raised from the normal position is lowered and thus churning loss that has increased as compared to the normal case can be maximally reduced.

In the journal bearing of embodiment 5 configured as described above, the same effects as in the above embodiments are provided, and in addition, at least one of the oil outlets is provided with an open/close unit for adjusting an oil discharge amount of oil in a bearing region surrounded by the outer circumferential surface of the rotary shaft, the inner circumferential surface of the carrier ring, and the side plates.

Thus, churning loss can be reduced through adjustment of the open/close unit, whereby unstable vibration of each pad and the notary shaft can be further suppressed while churning loss can be further reduced.

Embodiment 6

Figure 9:
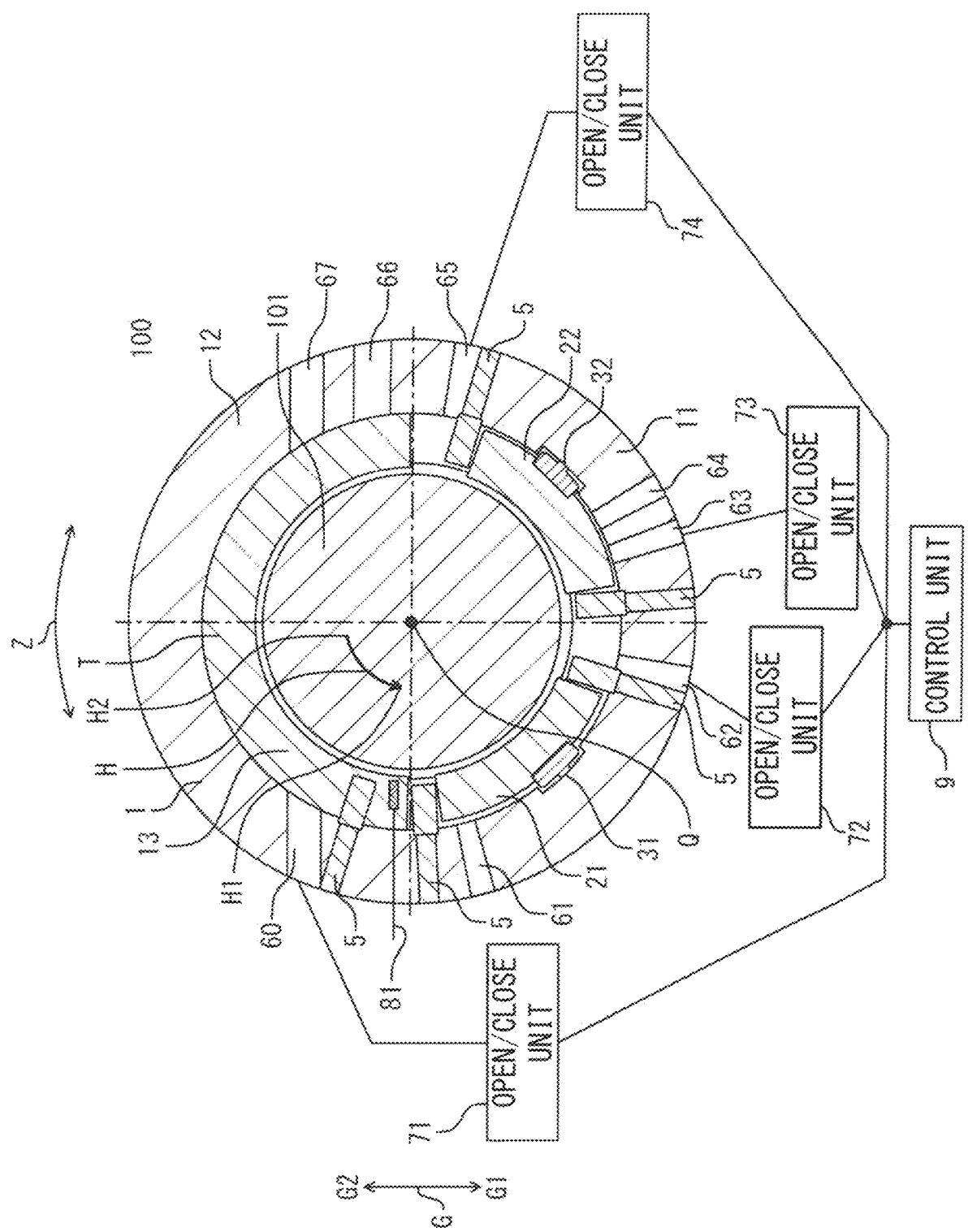
FIG. 9 is a sectional view of a journal bearing according to embodiment 6, along a direction perpendicular to the axial direction.

FIG. 9 is a sectional view of a journal bearing 100 according to embodiment 6, along a direction perpendicular to the axial direction Y. The same parts as in the above embodiments are denoted by the same reference characters and description thereof is omitted.

As shown in FIG. 9, oil outlets 60, 62, 63, 64 are respectively provided with open/close units 71, 72, 73, 74 for adjusting the oil discharge amounts. Further, provided are a sensor 81 for oetecting presence/absence of oil located in a range that is from 0 degrees to 180 degrees and is from the position at the vertical height L2 of the upstream pivot 31 to the position at the topmost vertical height L3 of the rotary shaft 101, and a control unit 9 for adjusting open/close operation of at least one of the open/close units 71, 72, 73, 74 on the basis of a measurement value of the sensor 81.

The oil outlet 60 is formed in a range that is from 0 degrees to 180 degrees and is from the position at the vertical height L2 of the upstream pivot 31 to the position at the topmost vertical height L3 of the rotary shaft 101.

The sensor 81 detects presence/absence of oil. The sensor 81 may be, for example, a viscometer, a pressure gauge, a thermometer, infrared thermography, an electromagnetic-wave radar meter, an ultrasonic thickness sensor, or the like, and performs detection on the basis of a property difference between oil and air. Oil in the bearing region T generates heat due to a shear force by rotation of the rotary shaft 101, so that the temperature of oil becomes higher than air. Accordingly, the detection may be performed on the basis of the temperature difference.

In embodiment 6 configured as described above, for example, in a case where presence of oil is detected by the sensor 81, the control unit 9 performs control of adjusting open/close operation of the open/close unit 71 or the open/close unit 74 to increase the discharge amount through the oil outlet 60 or the oil outlet 65. Thus, the oil-surface height J1 on the backward side H2 in the rotation direction H of the upstream pad 21 is kept, or the oil-surface height J3 on the forward side H1 in the rotation direction H of the downstream pad 22 is lowered, so that churning loss is assuredly reduced, while the gap between the inner circumferential surface of the upstream pad 21 and the outer circumferential surface of the rotary shaft 101 is filled with oil, whereby unstable vibration of each pad 21, 22 and the rotary shaft 101 due to oil insufficiency can be suppressed.

In the journal bearing of embodiment 6 configured as described above, the same effects as in the above embodiments are provided, and in addition, the journal bearing further includes: a sensor for detecting presence/absence of oil in, of the bearing region, a range that is from C degrees to 180 degrees and is from the position at the vertical height of the upstream pivot to the position at the topmost vertical height of the rotary shaft; and a control unit for controlling the open/close unit on the basis of a measurement value of the sensor.

Thus, owing to control by the control unit, churning loss can be further reduced, whereby unstable vibration of each pad and the rotary shaft can be further suppressed while churning loss can be further reduced.

Embodiment 7

Figure 10:
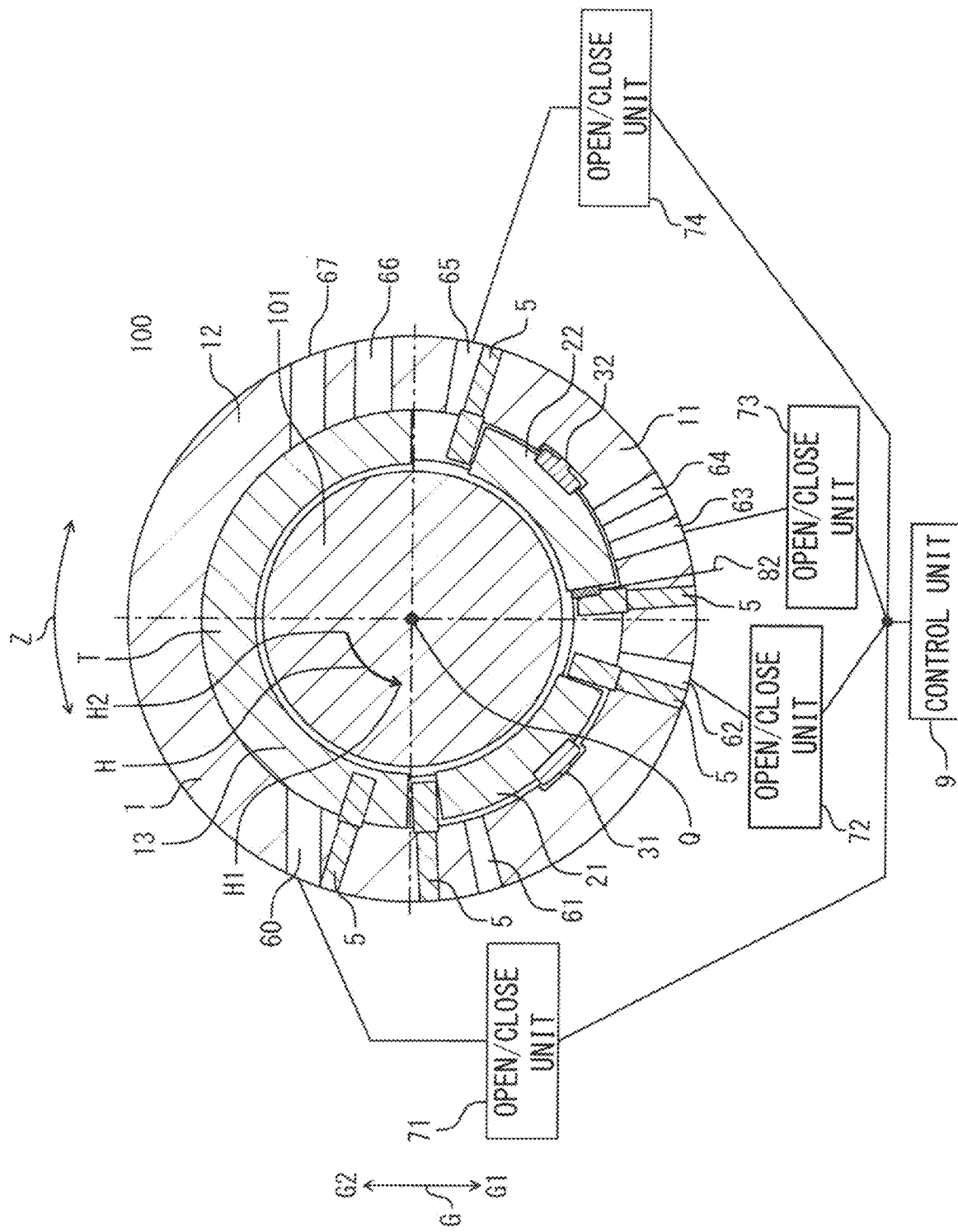
FIG. 10 is a sectional view of a journal bearing according to embodiment 7, along a direction perpendicular to the axial direction.

FIG. 10 is a sectional view of a journal bearing 100 according to embodiment 7, along a direction perpendicular to the axial direction Y. The same parts as in the above embodiments are denoted by the same reference characters and description thereof is omitted.

As shown in FIG. 10, a sensor 82 for detecting presence/absence ci oil located on the forward side H1 in the rotation direction H of the rotary shaft 101 from the upstream pivot 31 and on the backward side H2 in the rotation direction H of the rotary shaft 101 from the downstream pivot 32, is provided. The control unit 9 adjusts open/close operation of at least one of the open/close units 71, 72, 73, 74 on the basis of a measurement value of the sensor 82.

In embodiment 7 configured as described above, for example, in a case where presence of oil is detected by the sensor 82, the control unit 9 adjusts open/close operation of the open/close unit 72, the open/close unit 73, or the open/close unit 74 to increase the discharge amount through the oil outlet 62, the oil outlet 63, or the oil outlet 64. Thus, the oil-surface height J2 between the upstream pad 21 and the downstream pad 22 or the oil-surface height J3 on the forward side H1 in the rotation direction H of the downstream pad 22 is lowered, so that churning loss is assuredly reduced, while the gap between the inner circumferential surface of the downstream pad 22 and the outer circumferential surface of the rotary shaft 101 is filled with oil, whereby unstable vibration of each pad 21, 22 and the rotary shaft 101 due to oil insufficiency can be suppressed.

In the journal bearing of embodiment 7 configured as described above, the same effects as in the above embodiments are provided, and in addition, the journal bearing further includes: a sensor for detecting presence/absence of oil in, of the bearing region, a range that is on the forward side in the rotation direction of the rotary shaft from the upstream pivot and on the backward side in the rotation direction of the rotary shaft from the downstream pivot; and a control unit for controlling the open/close unit on the basis of a measurement value of the sensor.

Thus, owing to control by the control unit, churning loss can be further reduced, whereby unstable vibration of each pad and the rotary shaft can be further suppressed while churning loss can be further reduced.

Embodiment 8

Figure 11:
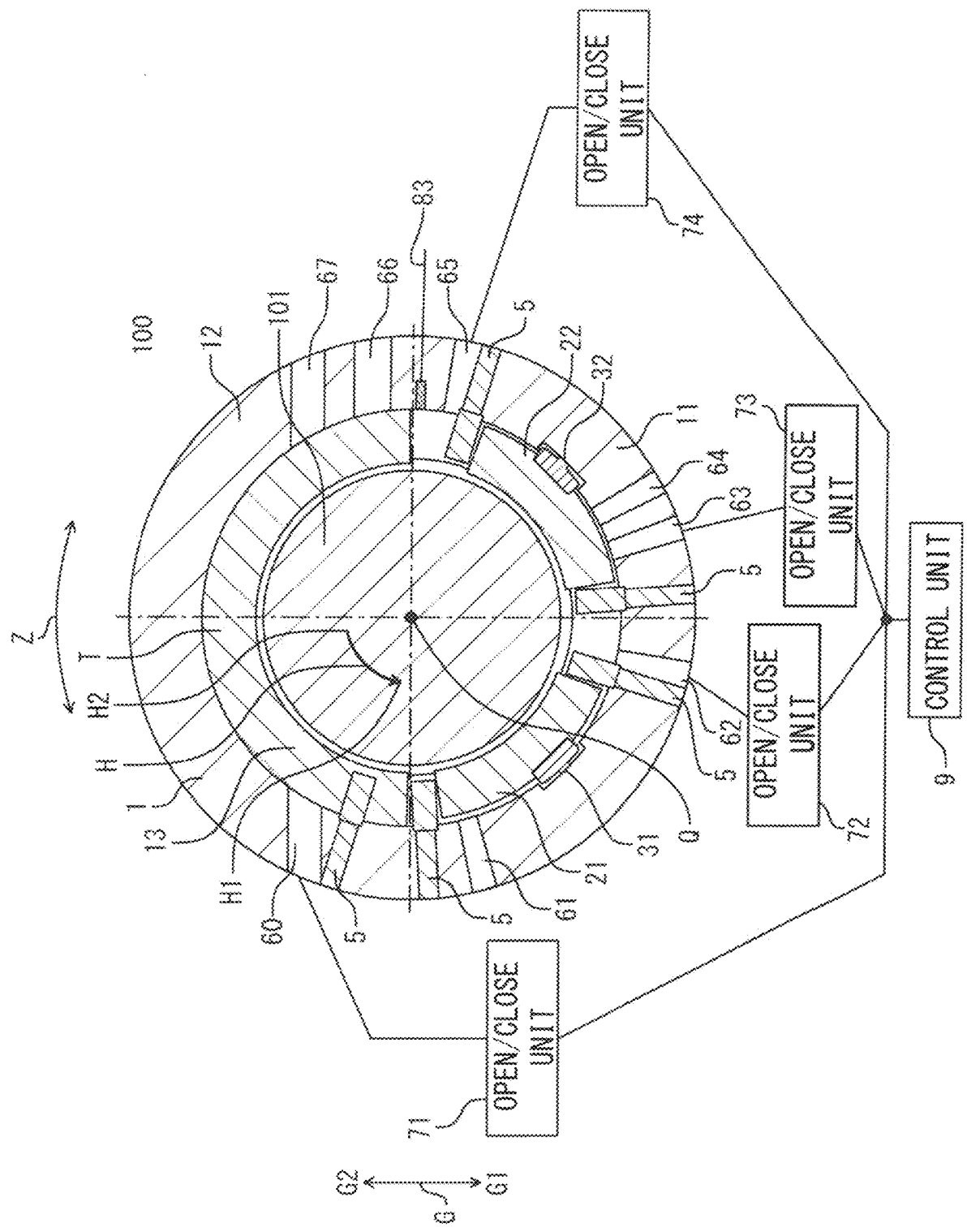
FIG. 11 is a sectional view of a journal bearing according to embodiment 8, along a direction perpendicular to the axial direction.

FIG. 11 is a sectional view of a journal bearing 100 according to embodiment 8, along a direction perpendicular to the axial direction Y. The same parts as in the above embodiments are denoted by the same reference characters and description thereof is omitted.

As shown in FIG. 11, a sensor 83 for detecting presence/absence of oil located in a range that is from 180 degrees to 360 degrees and is from the position at the vertical height L1 of the downstream pivot 32 to the position at the topmost vertical height L3 of the rotary shaft 101, is provided. The control unit 9 adjusts open/close operation of at least one of the open/close units 71, 72, 73, 74 on the basis of a measurement value of the sensor 83.

In embodiment 8 configured as described above, for example, in a case where presence of oil is detected by the sensor 83, the control unit 9 adjusts the open/close unit 74 to increase the discharge amount through the oil outlet 65. Thus, the oil-surface height J3 on the forward side H1 in the rotation direction H of the downstream pad 22 is lowered, whereby churning loss can be assuredly reduced.

In the journal bearing of embodiment 8 configured as described above, the same effects as in the above embodiments are provided, and in addition, the journal bearing further includes: a sensor for detecting presence/absence of oil in, of the bearing region, a range that is from 180 degrees to 360 degrees and is from the position at the vertical height of the downstream pivot to the position at the topmost vertical height of the rotary shaft; and a control unit for controlling the open/close unit on the basis of a measurement value of the sensor.

Thus, owing to control by the control unit, churning loss can be further reduced, whereby unstable vibration of each pad and the rotary shaft can be further suppressed while churning loss can be further reduced.

Embodiment 9

Figure 12:
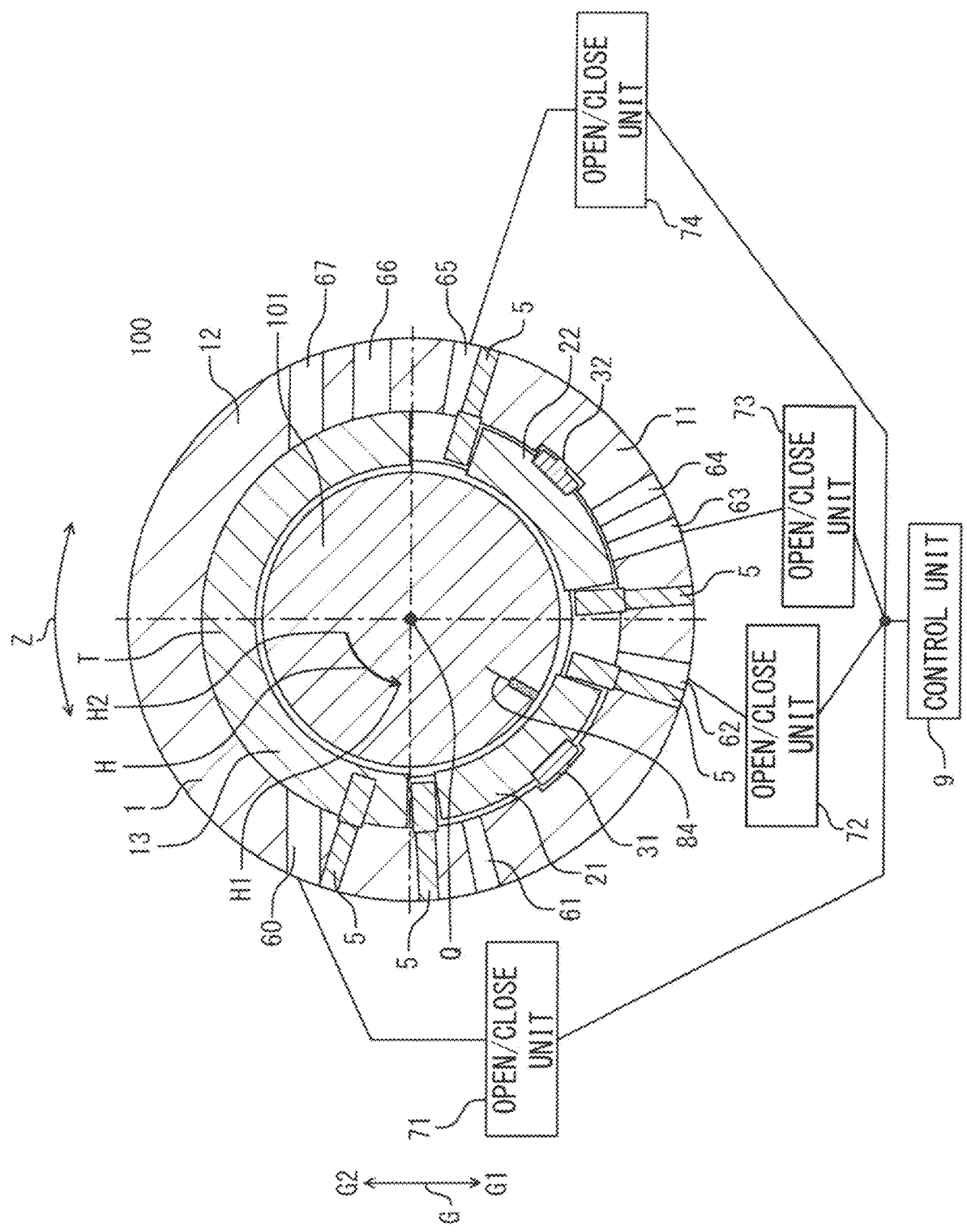
FIG. 12 is a sectional view of a journal bearing according to embodiment 9, along a direction perpendicular to the axial direction.

FIG. 12 is a sectional view of a journal bearing 100 according to embodiment 9, along a direction perpendicular to the axial direction Y. The same parts as in the above embodiments are denoted by the same reference characters and description thereof is omitted.

As shown in FIG. 12, a sensor 84 for detecting presence/absence of oil located in the vicinity of the outer circumferential surface of the rotary shaft 101, is provided. The sensor 84 can measure presence/absence of oil at all positions in the circumferential direction Z through rotation of the rotary shaft 101. The control unit 9 adjusts open/close operation of at least one of the open/close units 71, 72, 73, 74 on the basis of a measurement value of the sensor 84.

In embodiment 9 configured as described above, for example, in a case where the position where presence of oil is detected by the sensor 84 is in such a region that the oil surface can be determined to be lower as compared to the gap between the outer circumferential surface of the rotary shaft 101 and the inner circumferential surface of each pad 21, 22, the control unit 9 closes the oil outlet 6 in the vicinity of the region by the open/close unit, to raise only the oil surface in the vicinity of the position, whereby unstable vibration of the rotary shaft 101 and each pad 21, 22 can be suppressed.

Conversely, in such a region that the oil surface can be determined to be excessively higher as compared to the gap between the outer circumferential surface of the rotary shaft 101 and the inner circumferential surface of each pad 21, 22 on the basis of a measured oil-surface distribution, the control unit 9 opens the oil outlet 6 in the vicinity of the region by the open/close unit, to lower only the oil surface in the vicinity of the position, whereby churning loss can be reduced.

Since the sensor 84 is provided in the vicinity of the outer circumferential surface of the rotary shaft 101, it is also possible to detect presence/absence of oil adhering on the surface of the rotary shaft 101, whereby the oil-surface distribution can be measured more accurately. Since oil is likely to be accumulated on the downward side G1 of the journal bearing 200, in a region where there is a less amount of air layer, e.g., between the upstream pad 21 and the downstream pad 22, the oil surface which is the oil-air interface might exhibit a complicated distribution. However, in embodiment 9, the oil-surface distribution in the circumferential direction Z can be accurately detected.

For example, in a case where, between the upstream pad 21 and the downstream pad 22, the control unit 9 detects no oil in the vicinity of the upstream pad 21 but detects oil in the vicinity of the downstream pad 22 on the basis of a measurement value of the sensor 84, it can be determined that supply of oil to the lap between the downstream pad 22 and the rotary shaft 101 can be sufficiently ensured. Therefore, by adjusting the open/close unit 72 to open the oil outlet 62, supply of oil to the gap between the downstream pad 22 and the rotary shaft 101 is ensured, whereby unstable vibration can be suppressed while churning loss can be reduced.

Conversely, in a case where, between the upstream pad 21 and the downstream pad 22, the control unit 9 detects oil in the vicinity of the upstream pad 21 but detects no oil in the vicinity of the downstream pad 22 on the basis of a measurement value of the sensor 84, it can be determined that supply of oil to the gap between the downstream pad 22 and the rotary shaft 10, is hardly ensured. In this case, if the open/close unit 72 is adjusted to open the oil outlet 62, it can be predicted that not only the oil surface in the vicinity of the upstream pad 21 where oil is detected but also the oil surface in the vicinity of the downstream pad 22 where no oil is detected is lowered so that unstable vibration occurs.

Therefore, in this case, the open/close unit 71 or the open/close unit 74 is controlled to adjust the oil outlet 60 or the oil outlet 65 which is not present at a position on the forward side H1 in the rotation direction H from the upstream pivot 31 and on the backward side H2 in the rotation direction H from the downstream pivot 32, so as to open the oil outlet 60 or the oil outlet 65. Thus, only the oil surface on the backward side H2 in the rotation direction H from the upstream pad 21 or the oil surface on the forward side H1 in the rotation direction H from the downstream pad 22 is lowered, whereby unstable vibration can be suppressed while churning loss can be reduced.

As described above, each of the open/close units 71 to 74 is adjusted by the control unit 9 on the basis of at least a part of the oil-surface distribution using a measurement value of the sensor 84 provided to the rotary shaft 101, whereby unstable vibration of the rotary shaft 101 and each pad 21, 22 can be suppressed while churning loss can be reduced.

In the journal bearing of embodiment 9 configured as described above, the same effects as in the above embodiments are provided, and in addition, in a case where the rotating machine has, on the outer circumferential surface side of the rotary shaft, a sensor for detecting presence/absence of oil in the bearing region, the journal bearing further includes a control unit for controlling the open/close unit on the basis of a measurement value of the sensor.

Thus, owing to control by the control unit, churning loss can be further reduced, whereby unstable vibration of each pad and the rotary shaft can be further suppressed while churning loss can be further reduced.

Embodiment 10

Figure 13:
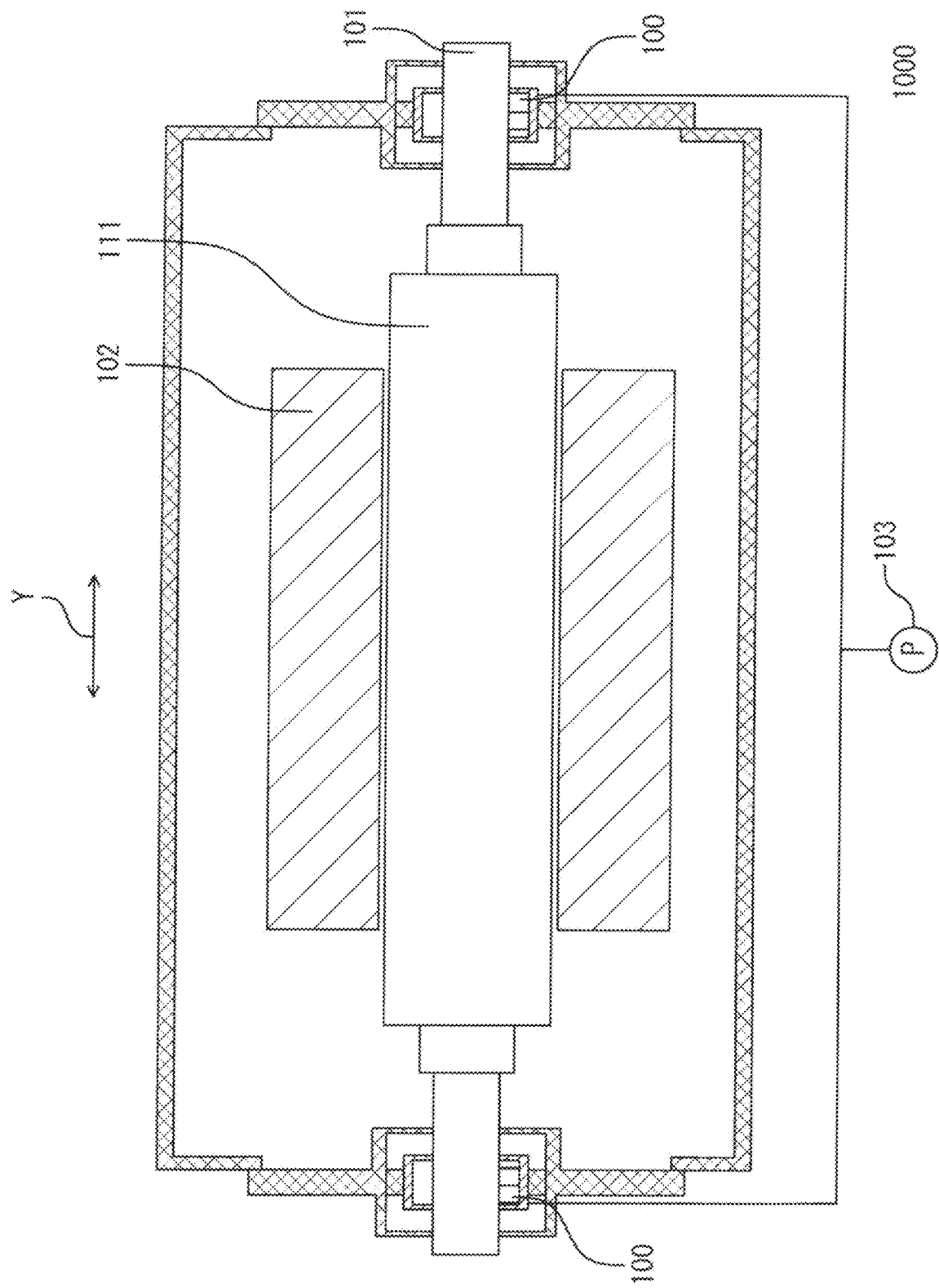
FIG. 13 is a sectional view of a rotating machine using a journal bearing according to embodiment 10.

FIG. 13 is a sectional view showing the structure of a rotating machine 1000 according to embodiment 10, taken along the axial direction Y. The same parts as in the above embodiments are denoted by the same reference characters and description thereof is omitted. As shown in FIG. 13, the rotating machine 1001 includes a rotary shaft 101 provided horizontally, a pair of journal bearings 100 rotatably supporting both ends of the rotary shaft 101, and a stator 102 provided on the outer circumferential side of the rotary shaft 101. At least one of the pair of journal bearings 100 is the journal bearing 100 according to any of the above embodiments. The detailed structures of the journal bearings 100 are not shown in the drawing, as appropriate.

Each of the journal bearings 100 is provided on the outer circumferential side at the end of the rotary shaft 101. Each of the journal bearings 100 supports the rotary shaft 101. A rotor 111 having magnetic poles is provided to the rotary shaft 101. In the present embodiment, as the rotating machine 1000, a rotating electric machine which generates electricity by inducing AC voltage at the stator 102 is shown, for example.

In the present embodiment, bearing loss that occurs at the journal bearing 100 with respect to energy of the rotary shaft 101 can be reduced, whereby electric generation efficiency of the rotating electric machine can be improved. In addition, by adjusting the oil discharge pattern to appropriately control the oil-surface distribution, the amount of oil supplied to the journal bearing 100 can be reduced to the minimum necessary amount, whereby oil-supply equipment such as an oil-supply pump 103 can be downsized.

In the rotating machine of embodiment 10 configured as described above, the same effects as in the above embodiments are provided, and in addition, the rotating machine includes: a journal bearing; and the rotary shaft supported by the journal bearing.

Thus, unstable vibration of each pad and the rotary shaft in the rotating machine can be suppressed while churning loss can be reduced.

Embodiment 11

Figure 14:
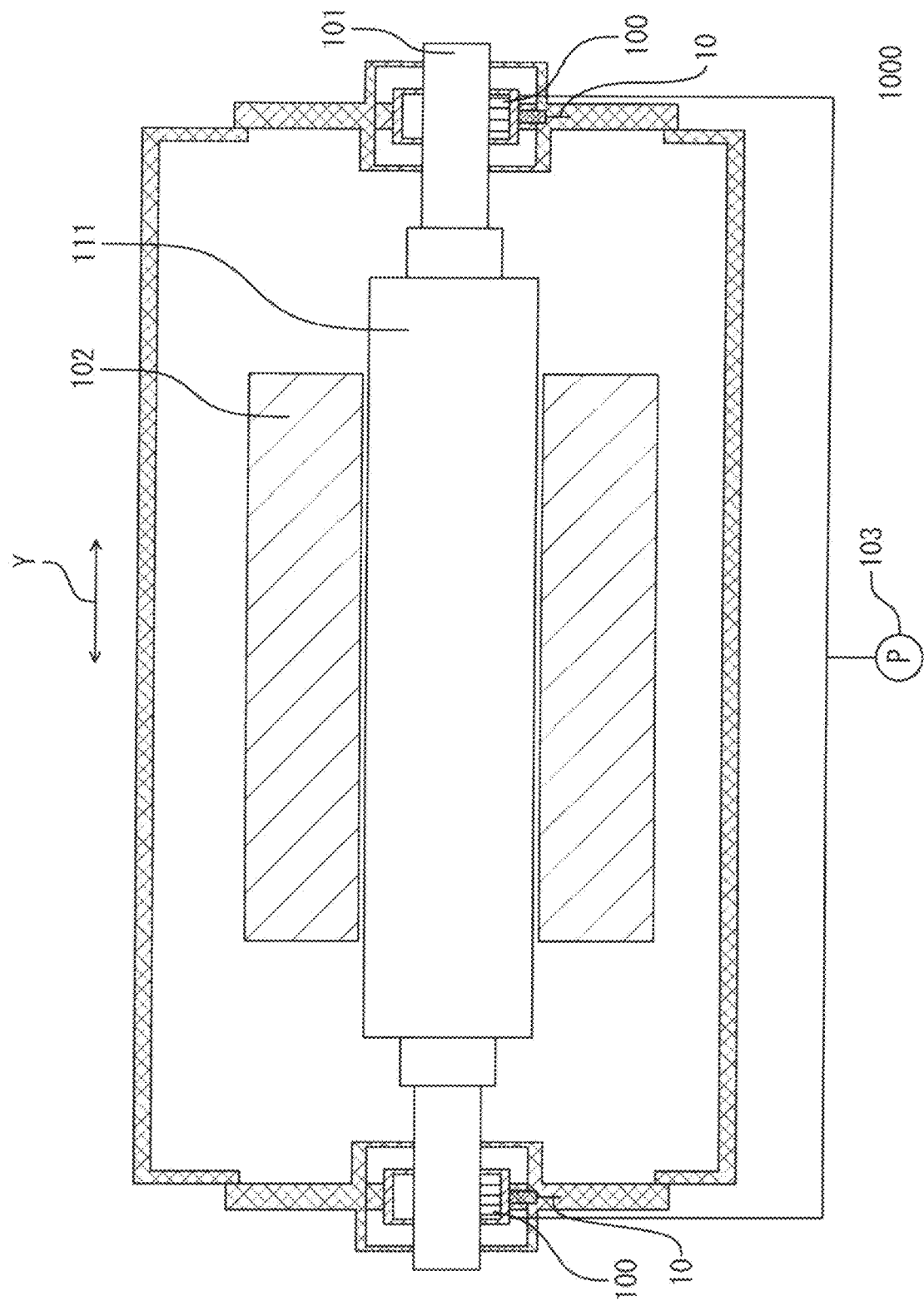
FIG. 14 is a sectional view of a rotating machine using a journal bearing according to embodiment 11.
Figure 15:
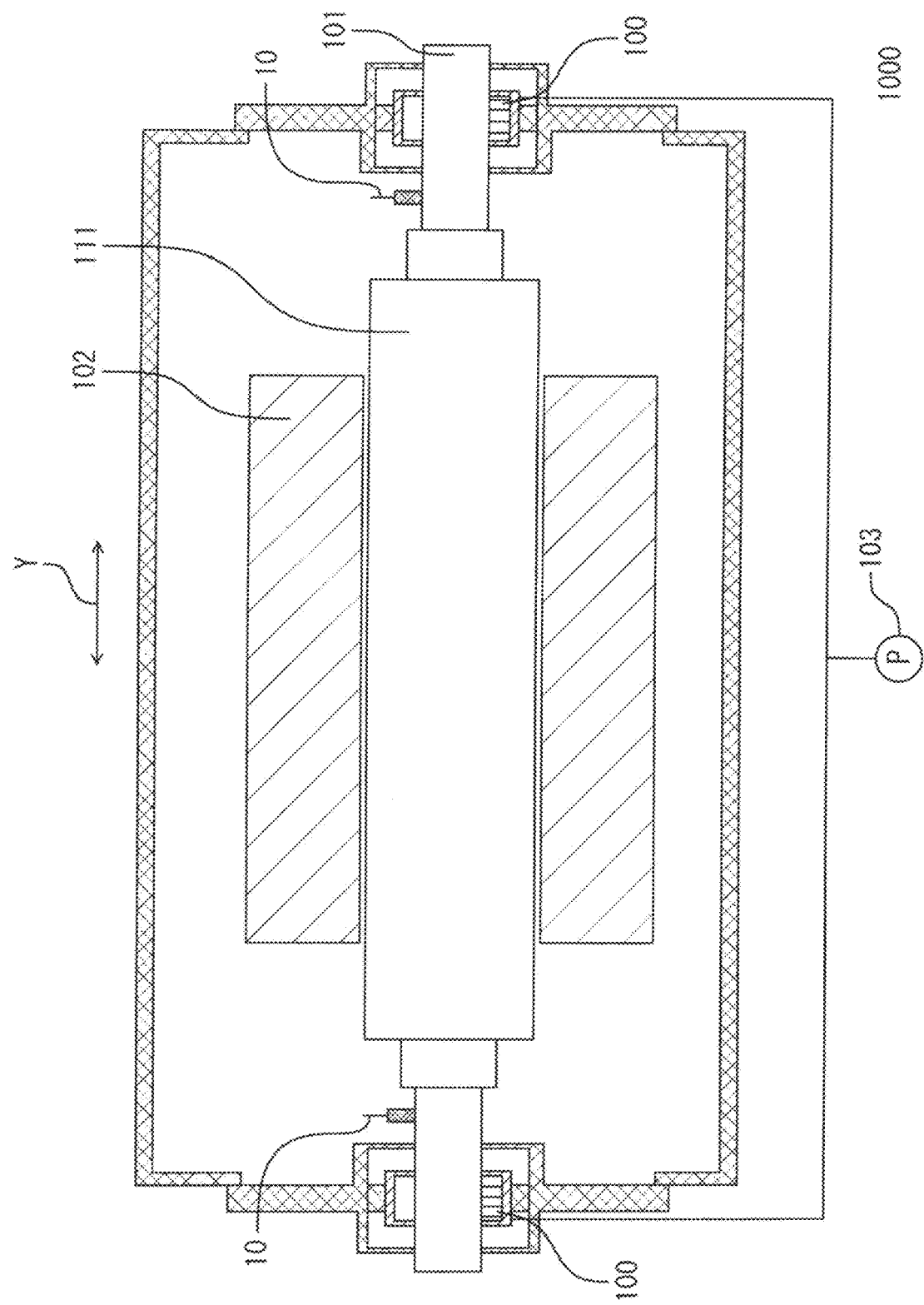
FIG. 15 is a sectional view of another rotating machine using a journal bearing according to embodiment 11.
Figure 16:
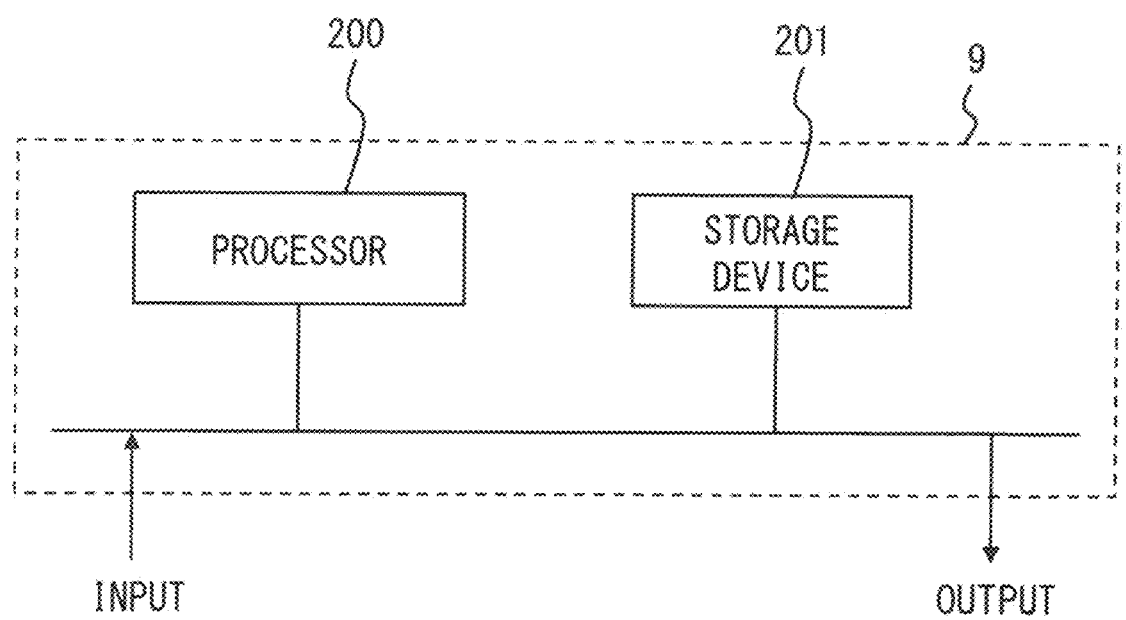
FIG. 16 is a block diagram of a control unit of the journal bearing according to each embodiment 9 to 11.

FIG. 14 and FIG. 15 are sectional views showing the structure of a rotating machine 1000 according to embodiment 11, taken along the axial direction Y. The same parts as in the above embodiments are denoted by the same reference characters and description thereof is omitted. The detailed structures of the journal bearings 100 are not shown in the drawings, as appropriate. Therefore, the parts whose reference characters are not shown in the drawings have the same structures as in the above embodiments.

In FIG. 4, the rotating machine 1000 is provided with a vibration meter 10 for detecting vibration or displacement of each pad 21, 22. In FIG. 15, the rotating machine 1000 is provided with a vibration meter 10 for detecting vibration or displacement of the rotary shaft 101. Thus, FIG. 14 and FIG. 15 show different placement positions of the vibration meter 10. The control unit 9 adjusts at least one open/close unit 7 on the basis of a measurement value of the vibration meter 10.

In embodiment 11 configured as described above, if oil becomes insufficient in the gap between the inner circumferential surface of each pad 21, 22 and the outer circumferential surface of the rotary shaft 101, the oil-film pressure on the backyard side H2 in the rotation direction H of the gap decreases constantly or transiently, so that, in accordance with the balance of the moment about the upstream pivot 31, the upstream pad 21 is displaced or vibrates in a direction close to the rotary shaft 101, on the backward side H2 in the rotation direction H from the upstream pivot 31, and is displaced or vibrates in a direction away from the rotary shaft 101, on the forward side H1 in the rotation direction H from the upstream pivot 31. At this time, the rotary shaft 101 is displaced or vibrates in a direction close to the upstream pivot 31.

In addition, if oil becomes insufficient in the gap between the inner circumferential surface of the downstream pad 22 and the outer circumferential surface of the rotary shaft 101, the oil-film pressure on the backward side H2 in the rotation direction H of the gap decreases constantly or transiently, so that, in accordance with the balance of the moment about the downstream pivot 32, the downstream pad 22 is displaced or vibrates in a direction close to the rotary shaft 101, on the backward side H2 in the rotation direction H from the downstream pivot 32, and is displaced or vibrates in a direction away from the rotary shaft 101, on the forward side H1 in the rotation direction H from the downstream pivot 32. At this time, the rotary shaft 101 is displaced or vibrates in a direction close to the downstream pivot 32.

That is, by detecting the direction of displacement or vibration of each pad 21, 22 and the direction of displacement or vibration of the rotary shaft 101, it is found where in the gap oil is insufficient so that the oil-film pressure has decreased constantly or transiently. In embodiment 11, the place where oil is insufficient in the gap can be specified using the vibration meter 10 for detecting vibration or displacement of each pad 21, 22 or the rotary shaft 101. Then, by adjusting the open/close unit 7 by the control unit 9, the oil discharge amount through the oil outlet 6 in the vicinity of the place where the oil is insufficient is reduced so that the oil surface is raised and oil insufficiency is eliminated, whereby unstable vibration of each pad 21, 22 and the rotary shaft 101 can be suppressed.

The vibration meter 10 for detecting vibration or displacement of the upstream pad 21 is attached at a position as far from the upstream pivot 31 as possible, and the vibration meter 10 for detecting vibration or displacement of the downstream pad 22 is attached at a position as far from the downstream pivot 32 as possible. Thus, the displacement amount or the vibration amount that is detected increases. Therefore, at a stage when slight oil insufficiency has occurred, the discharge amount of oil through the oil outlet 6 in the vicinity of the place where oil is insufficient is reduced so that the oil surface is raised and oil insufficiency is eliminated, whereby unstable vibration of each pad 21, 22 and the rotary shaft 101 can be further suppressed.

In the present embodiment, the place where oil is not insufficient can also be specified at the same time. Therefore, by adjusting the open/close unit 7 by the control unit 9, the discharge amount of oil through the oil outlet 6 in the vicinity of the place where oil is not insufficient may be increased so that the oil surface is lowered, whereby churning loss can be reduced.

In the rotating machine of embodiment 10 configured as described above, the same effects as in the above embodiments are provided, and in addition, the rotating machine includes: the journal bearing; the rotary shaft supported by the journal bearing; a vibration meter for detecting vibration or displacement of the upstream pad, the downstream pad, or the rotary shaft; and a control unit for controlling the open/close unit on the basis of a measurement value of the vibration meter.

Thus, unstable vibration of each pad and the rotary shaft in the rotating machine can be further suppressed while churning loss can be further reduced.

In the above embodiments, the number of the oil-supply nozzles 5 is five, as an example. However, the number of the oil-supply nozzles 5 may be zero to four or more than five. In a case where the number of the oil-supply nozzles 5 is zero, the journal bearing 100 has another oil supply unit. The arrangement positions of the pads 21, 22 and the oil-supply nozzles 5 are not limited to those shown in the drawings. The arrangement positions and the shapes of the oil outlets 6 are not limited to those shown in the drawings.

The unstable vibration suppression effect and the churning loss reduction effect for the rotary shaft 101 and the pads 21, 22 by actions of the oil outlets 6 do not depend on the shapes of the pads 21, 22 and the oil-supply nozzles 5. Therefore, the shapes of the pads 21, 22 and the oil-supply nozzles 5 are not limited to those shown in the drawings.

The upstream pad 21 and the downstream pad 22 may have a single-layer structure formed by a single material, or a multilayer structure formed by a plurality of materials. As the material forming the upstream pad 21 and the downstream pad 22, various materials such as metal and resin may be used.

The number, the arrangement positions, and the shapes of the oil outlets 6 are not limited to those shown in the drawings.

The number and the arrangement positions of the open/close units 2 are not limited to those shown in the drawings.

The number and the arrangement positions of the control units 9 are rot limited to those shown in the drawings.

For the rotating machine 1000, the oil discharge pattern can be optimized by the control unit 9 adjusting the open/close unit 7 in accordance with numerical data representing the operation state of the rotating machine 1000, or the like. On the backward side H2 in the rotation direction H of the upstream pad 21, air accumulated on the upward side G2 in the bearing region T flows to the forward side H1 in the rotation direction H due to a shear force by rotation of the rotary shaft 101, so that the oil surface is readily lowered on the backward side H2 in the rotation direction H of the upstream pad 21. Here, the lowering amount thereof differs by the rotational speed. When the rotational speed is low, a shear force by rotation of the rotary shaft 101 is small, so that the lowering amount of the oil surface on the backward side H2 in the rotation direction H of the upstream pad 21 is small, and when the rotational speed is high, a shear force by rotation of the rotary shaft 101 is great, so that the lowering amount of the oil surface on the backward side H2 in the rotation direction H of the upstream pad 21 is large.

For example, when the rotational speed is low, the open/close unit 7 may be adjusted by the control unit 9 to open the oil outlet E in the vicinity of the upstream pad 21, and when the rotational speed is high, the open/close unit 7 may be adjusted by the control unit 9 to close the oil outlet 6 in the vicinity of the upstream pad 21, whereby the oil-surface height can be kept constant irrespective of the rotational speed. Thus, such a phenomenon that, depending on the rotational speed, unstable vibration of each pad 21, 22 and the rotary shaft 101 increases and the contact area between the rotary shift 101 and oil increases so that churning loss increases, does not occur, and it is possible to constantly suppress unstable vibration of each pad 21, 22 and the rotary shaft 101 while continuing maximally reducing churning loss.

Through recognition of the oil-surface distribution by the sensor or the vibration meter, in such a region that the oil surface can be determined to be lower as compared to the gap between the outer circumferential surface of the rotary shaft 101 and the inner circumferential surface of each pad 21, 22, the open/close unit 7 may be adjusted by the control unit 9 to close the oil outlet 6 in the vicinity of the region, so that only the oil surface in the vicinity of the region is raised, whereby unstable vibration of the rotary shaft 101 and each pad 21, 22 can be suppressed. In such a region that the oil surface can be determined to be excessively higher as compared to the gap between the outer circumferential surface of the rotary shaft 101 and the inner circumferential surface of each pad 21, 22, the open/close unit 7 may be adjusted by the control unit 9 to open the oil outlet 6 in the vicinity of the region, so that only the oil surface in the vicinity of the region is lowered, whereby churning loss can be reduced.

In the rotating machine 1000, the number of the journal bearings 100 shown in FIG. 13 to FIG. 15 is two. However, the number of the journal bearings may be one, or three or more. The arrangement positions of the journal bearings 100 are not limited to those shown in FIG. 13 to FIG. 15.

The journal bearing 100 may have a state in which oil is not supplied to the bearing region T of the journal bearing 100.

The control unit 9 is composed of a processor 200 and a storage device 201 as shown in FIG. 15 which shows an example of hardware. The storage device is provided with a volatile storage de-ice such as a random access memory and a nonvolatile auxiliary storage device such as a flash memory, although not shown. Instead of the flash memory, an auxiliary storage device of a hard disk may be provided. The processor 200 executes a program inputted from the storage device 201. In this case, the program is inputted from the auxiliary storage device to the processor 200 via the volatile storage device. The processor 200 may output data such as a calculation result to the volatile storage device of the storage device 201, or may store such data into the auxiliary storage device via the volatile storage device.

Although the disclosure is described above in terms of various exemplary embodiments and implementations, it should be understood that the various features, aspects, and functionality described in one or more of the individual embodiments are no limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 carrier ring
10 vibration meter
100 journal bearing
101 rotary shaft
111 rotor
102 stator
103 oil-supply pump
1000 rotating machine
11 lower-half part
12 upper-half part
13 guide metal
200 processor
201 storage device
21 upstream pad
22 downstream pad
31 upstream pivot
32 downstream pivot
4 side plate
5 oil-supply nozzle
6 oil outlet
60 oil out let
61 oil outlet
62 oil outlet
63 oil outlet
64 oil outlet
65 oil outlet
66 oil outlet
67 oil outlet
68 oil outlet
69 oil outlet
7 open/close unit
71 open/close unit
72 open/close unit
73 open/close unit
74 open/close unit
75 open/close unit
81 sensor
82 sensor
83 sensor
84 sensor
9 control unit
G vertical direction
G1 downward side
G2 upward side H rotation direction
H1 forward side
H2 backward side
Q axis
S part
J1 oil-surface height
J2 oil-surface height
J3 oil-surface height
L1 vertical height
L2 vertical height
L3 vertical height
Y axis direction
Z circumferential direction
Z1 circumferential-direction position
Z10 arrow
Z11 upper end
Z12 lower end
Z2 circumferential-direction position
Z20 arrow
Z3 circumferential-direction position

The invention claimed is:

1. A journal bearing which supports a rotary shaft of a rotating machine, the journal bearing comprising:
a carrier ring provided on an outer circumferential side of the rotary shaft with an interval therebetween, the carrier ring having a plurality of oil outlets penetrating from an inner circumferential surface to an outer circumferential surface of the carrier ring, where a half of the carrier ring that is positioned on a load-direction side of the rotary shaft is defined as a lower-half part;
an upstream pad and a downstream pad which are located at different positions in a circumferential direction, between an inner circumferential surface of the lower-half part of the carrier ring and an outer circumferential surface of the rotary shaft, the upstream pad being positioned on a backward side in a rotation direction of the rotary shaft, and the downstream pad being positioned on a forward side in the rotation direction of the rotary shaft;
an upstream pivot swingably supporting the upstream pad at the inner circumferential surface of the carrier ring;
a downstream pivot swingably supporting the downstream pad at the inner circumferential surface of the carrier ring;
an open/close switch which is provided to at least one of the oil outlets and adjusts an oil discharge amount of oil; and
a control circuitry for controlling the open/close switch on the basis of a measurement value of a sensor for detecting presence/absence of oil on the outer circumferential surface side of the rotary shaft, wherein
the carrier ring has the plurality of oil outlets arranged in the circumferential direction and penetrating from the inner circumferential surface to the outer circumferential surface of the carrier ring,
where, in a cross-section of the journal bearing along a direction perpendicular to an axial direction, an upper end in the load direction is defined as 0 degrees, a lower end is defined as 180 degrees, and the upper end is further defined as 360 degrees, along the rotation direction,
the oil outlets are located in, of the carrier ring, at least two of:
a range that is on the forward side in the rotation direction of the rotary shaft from the upstream pivot and on the backward side in the rotation direction of the rotary shaft from the downstream pivot,
a range that is from 180 degrees to 360 degrees and is from a position at a vertical height of the downstream pivot to a position at a topmost vertical height of the rotary shaft, or
a range that is from 0 degrees to 180 degrees and is from a position at a vertical height of the upstream pivot to the position at the topmost vertical height of the rotary shaft, and
at least one of the oil outlets located in the at least two ranges is provided with the open/close switch.

2. The journal bearing according to claim 1, wherein
the sensor detects presence/absence of oil in, of bearing region, the range that is from 0 degrees to 180 degrees and is from the position at the vertical height of the upstream pivot to the position at the topmost vertical height of the rotary shaft, the bearing region being surrounded by the outer circumferential surface of the rotary shaft, the inner circumferential surface of the carrier ring, and side plates respectively covering both ends in the axial direction of the upstream pad and the downstream pad.

3. The journal bearing according to claim 2, wherein
the sensor is provided on the outer circumferential side of the rotary shaft.

4. The journal bearing according to claim 2, wherein
at least one of the oil outlets includes a plurality of oil outlets arranged in the axial direction at the same circumferential-direction position.

5. The journal bearing according to claim 2, wherein
at least one of the oil outlets is located in the range in the circumferential direction where the upstream pad is located and that is on the forward side in the rotation direction of the rotary shaft from the upstream pivot.

6. The journal bearing according to claim 2, wherein
at least one of the oil outlets is located in the range in the circumferential direction where the downstream pad is located and that is on the forward side in the rotation direction of the rotary shaft from the downstream pivot.

7. The journal bearing according to claim 1, wherein
the sensor detects presence/absence of oil in, of a bearing region, the range that is on the forward side in the rotation direction of the rotary shaft from the upstream pivot and on the backward side in the rotation direction of the rotary shaft from the downstream pivot, the bearing region being surrounded by the outer circumferential surface of the rotary shaft, the inner circumferential surface of the carrier ring, and side plates respectively covering both ends in the axial direction of the upstream pad and the downstream pad.

8. The journal bearing according to claim 7, wherein
the sensor is provided on the outer circumferential side of the rotary shaft.

9. The journal bearing according to claim 7, wherein
at least one of the oil outlets includes a plurality of oil outlets arranged in the axial direction at the same circumferential-direction position.

10. The journal bearing according to claim 7, wherein
at least one of the oil outlets is located in the range in the circumferential direction where the upstream pad is located and that is on the forward side in the rotation direction of the rotary shaft from the upstream pivot.

11. The journal bearing according to claim 1, wherein
the sensor detects presence/absence of oil in, of a bearing region, the range that is from 180 degrees to 360 degrees and is from the position at the vertical height of the downstream pivot to the position at the topmost vertical height of the rotary shaft, the bearing region being surrounded by the outer circumferential surface of the rotary shaft, the inner circumferential surface of the carrier ring, and side plates respectively covering both ends in the axial direction of the upstream pad and the downstream pad.

12. The journal bearing according to claim 11, wherein the sensor is provided on the outer circumferential side of the rotary shaft.

13. The journal bearing according to claim 11, wherein at least one of the oil outlets includes a plurality of oil outlets arranged in the axial direction at the same circumferential-direction position.

14. The journal bearing according to claim 11, wherein at least one of the oil outlets is located in the range in the circumferential direction where the upstream pad is located and that is on the forward side in the rotation direction of the rotary shaft from the upstream pivot.

15. The journal bearing according to claim 1, wherein the sensor is provided on the outer circumferential side of the rotary shaft.

16. The journal bearing according to claim 1, wherein at least one of the oil outlets includes a plurality of oil outlets arranged in the axial direction at the same circumferential-direction position.

17. The journal bearing according to claim 1, wherein at least one of the oil outlets is located in the range in the circumferential direction where the upstream pad is located and that is on the forward side in the rotation direction of the rotary shaft from the upstream pivot.

18. The journal bearing according to claim 1, wherein at least one of the oil outlets is located in the range in the circumferential direction where the downstream pad is located and that is on the forward side in the rotation direction of the rotary shaft from the downstream pivot.

19. A rotating machine comprising:

the journal bearing according to claim 1; and the rotary shaft supported by the journal bearing.

20. The rotating machine according to claim 19, further comprising:

a vibration meter for detecting vibration or displacement of the upstream pad, the downstream pad, or the rotary shaft; and the control circuitry controls the open/close switch on the basis of a measurement value of the vibration meter.

\* \* \* \* \*